(12) United States Patent
Razazian et al.

(10) Patent No.: US 8,879,379 B1
(45) Date of Patent: Nov. 4, 2014

(54) TRANSMITTER AND METHOD FOR APPLYING MULTI-TONE OFDM BASED COMMUNICATIONS WITHIN A LOWER FREQUENCY RANGE

(71) Applicant: Maxim Integrated Products, Inc., San Jose, CA (US)

(72) Inventors: Kaveh Razazian, Aliso Viejo, CA (US); Afshin Niktash, Irvine, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 31 days.

(21) Appl. No.: 13/670,838

(22) Filed: Nov. 7, 2012

Related U.S. Application Data

(63) Continuation of application No. 12/795,537, filed on Jun. 7, 2010, now Pat. No. 8,320,233.

(60) Provisional application No. 61/186,627, filed on Jun. 12, 2009.

(51) Int. Cl.
*H04B 3/00* (2006.01)
*H04B 3/54* (2006.01)

(52) U.S. Cl.
CPC .......... *H04B 3/542* (2013.01); *H04B 2203/542* (2013.01)
USPC ........................................................ 370/208

(58) Field of Classification Search
CPC ...... H04B 3/54; H04B 3/542; H04L 27/2626; H04L 5/0044; H04L 25/0286; H04L 25/03834; H04L 1/0009; H04L 1/0041; H04L 1/0057; H04L 1/0059; H04L 1/0065; H04L 1/08

USPC .......... 370/208, 252, 340, 445, 468; 375/239; 455/426.2
See application file for complete search history.

(56) References Cited

U.S. PATENT DOCUMENTS 5,521,491 A * 5/1996 Najam ............................ 324/86
5,768,305 A 6/1998 Kanda
(Continued)

FOREIGN PATENT DOCUMENTS

EP 0657997 6/1995
EP 0866580 9/1998
(Continued)

OTHER PUBLICATIONS

"International Search Report and Written Opinion of the International Searching Authority Dated Oct. 5, 2010", International Application No. PCT/US2010/037835.

(Continued)

*Primary Examiner* — Pao Sinkantarakorn
*Assistant Examiner* — Richard Chang

(57) ABSTRACT

A method to detect a phase connection of a receiver of a power line communication system includes providing a first connection between a transmitter and one phase of a multi-phase power line. A zero crossing of a first signal provided by the first connection is detected. A first timestamp is generated before a packet is transmitted by the transmitter and added to a header of the packet. A second connection is provided between the receiver and one phase of the multi-phase power line. A zero crossing of a second signal provided by the second connection is detected. A second timestamp is generated when the packet is received by the receiver. The value of the first timestamp is compared to the value of the second timestamp to determine whether the one phase of the first connection is the same as the one phase of the second connection.

4 Claims, 17 Drawing Sheets

(56) References Cited

U.S. PATENT DOCUMENTS

| | | | |
|---|---|---|---|
| 5,841,385 | A | 11/1998 | Xie |
| 6,347,234 | B1 | 2/2002 | Scherzer |
| 6,415,004 | B1 | 7/2002 | Fujimura et al. |
| 6,614,864 | B1 | 9/2003 | Raphaeli et al. |
| 6,727,790 | B2 | 4/2004 | Raphaeli et al. |
| 6,799,193 | B2 | 9/2004 | Kilani et al. |
| 6,888,790 | B2 | 5/2005 | Kilani |
| 6,976,044 | B1 | 12/2005 | Kilani |
| 6,983,011 | B1 | 1/2006 | Hara et al. |
| 7,020,095 | B2 | 3/2006 | Chini et al. |
| 7,167,456 | B2 | 1/2007 | Iwamatsu et al. |
| 7,430,193 | B2 | 9/2008 | Kim et al. |
| 7,433,425 | B1 | 10/2008 | Lou et al. |
| 7,634,034 | B2 | 12/2009 | Larsson |
| 2002/0051499 | A1 | 5/2002 | Cameron et al. |
| 2002/0105901 | A1 | 8/2002 | Chini et al. |
| 2002/0188908 | A1 | 12/2002 | Yonge, III et al. |
| 2003/0156012 | A1 | 8/2003 | Omidi et al. |
| 2003/0224784 | A1 | 12/2003 | Hunt et al. |
| 2003/0235254 | A1 | 12/2003 | Fanson et al. |
| 2004/0062326 | A1 | 4/2004 | Burke et al. |
| 2004/0120249 | A1 | 6/2004 | Blasco Claret et al. |
| 2005/0163261 | A1 | 7/2005 | Nakao et al. |
| 2005/0281238 | A1 | 12/2005 | Blasco Clarest et al. |
| 2006/0002494 | A1 | 1/2006 | Zhang |
| 2006/0188033 | A1 | 8/2006 | Zehavi et al. |
| 2007/0025391 | A1* | 2/2007 | Yonge et al. ............... 370/458 |
| 2007/0030913 | A1 | 2/2007 | Lin |
| 2007/0064788 | A1 | 3/2007 | Yonge, III |
| 2007/0139118 | A1 | 6/2007 | Teo et al. |
| 2008/0002655 | A1* | 1/2008 | Logvinov et al. ........... 370/340 |
| 2008/0116877 | A1* | 5/2008 | Giubbini et al. ............. 324/84 |
| 2008/0279321 | A1* | 11/2008 | Bickel et al. ............... 375/356 |
| 2009/0003308 | A1 | 1/2009 | Baxley et al. |
| 2009/0135977 | A1 | 5/2009 | Sheu |
| 2009/0190704 | A1 | 7/2009 | Ben-Ari et al. |

FOREIGN PATENT DOCUMENTS

| | | |
|---|---|---|
| EP | 1178634 | 2/2002 |
| EP | 1501226 | 1/2005 |
| EP | 1538744 | 6/2005 |
| GB | 2329804 | 3/1999 |
| WO | WO 01/13560 | 2/2001 |
| WO | WO 02/49263 | 6/2002 |
| WO | WO 03/056741 | 7/2003 |
| WO | WO 03/100996 | 12/2003 |
| WO | WO 2004/028105 | 4/2004 |
| WO | WO 2006/130502 | 12/2006 |
| WO | WO/2009/149415 | 12/2009 |

OTHER PUBLICATIONS

"International Search Report and Written Opinion of the International Searching Authority Dated Oct. 1, 2009", International Application No. PCT/US2009/046512.

"International Search Report and Written Opinion of the International Searching Authority Dated Oct. 1, 2009", International Application No. PCT/US2009/046507.

"International Search Report and Written Opinion of the International Searching Authority Dated Aug. 12, 2009", International Application No. PCT/US2009/046516.

"International Search Report and Written Opinion of the International Searching Authority Dated Jun. 14, 2010", International Application No. PCT/US2009/046509.

"International Search Report and Written Opinion of the International Searching Authority Dated Oct. 15, 2009", International Application No. PCT/US2009/046510.

"Invitation to Pay Additional Fees and Accompanying Partial International Search by the International Searching Authority Dated Aug. 20, 2009", International Application No. PCT/US2009/046510.

"Invitation to Pay Additional Fees and Partial Search Report of the International Searching Authority Dated Apr. 9, 2010", International Application No. PCT/US2009/046509.

"Invitation to Pay Additional Fees and Partial Search Report of the International Searching Authority Dated Oct. 23, 2009", International Application No. PCT/US2009/046516.

"Invitation to Pay Additional Fees/Partial Search Report of the International Searching Authority Dated Feb. 9, 2010", International Application No. PCT/US2009/046519.

"Office Action Dated Oct. 26, 2010", U.S. Appl. No. 12/478,689.

"Office Action Dated Feb. 3, 2011", U.S. Appl. No. 12/478,701.

"Office Action Dated Jan. 28, 2011", U.S. Appl. No. 12/478,699.

"Office Action Dated Mar. 23, 2011", U.S. Appl. No. 12/478,689.

International Search Report and Written Opinion dated Oct. 16, 2009, for related International Application No. PCT/US2009/046502.

International Search Report and Written Opinion dated Apr. 15, 2010, for related International Application No. PCT/US2009/046519.

INT5200 Single Chip PowerPacket™ Transceiver, Revision 4, Intellon Corporation, Retrieved from the Internet: URL: http://www.datasheet4u.com/html/I/N/T/INT5200_InTellon.pdf.html, 2005.

Chen, Yi-Fu, et al., Baseband Tranceiver Design of a 128-Kbps Power-Line Modem for Household Application , IEEE Transactions on Power Delivery, vol. 17, No. 2, Apr. 2002, pp. 338-344.

Gault, Sophie, et al., An OFDMA Based Modem for Power Line Communications Over the Low Voltage Distribution Network, IEEE, Power Line Communications and Its Applications, 2005 International Symposium, Apr. 6-8, 2005, pp. 42-46.

Heo, Kyung L., et al., Design of a High Speed OFDM Modem System for Powerline Communications, IEEE Workshop, Signal Processing Systems (SIPS), Oct. 16-18, 2002, pp. 264-269.

Hsieh, Meng-Han, et al., A Low-Complexity Frame Synchronization and Frequency Offset Compensation Scheme for OFDM Systems Over Fading Channels, IEEE Transactions on Vehicular Technology, vol. 48, No. 5, Sep. 1999, pp. 1596-1609.

Hsu, Christine, et al., Improving HomePlug Power Line Communications With LDPC Coded OFDM, Annual International Telecommunications Energy Conference 28th, IEEE, Pl, Sep. 1, 2006, pp. 1-7.

Kwan, Tom, et al., Adaptive Detection and Enhancement of Multiple Sinusoids Using a Cascade IIR Filter, IEEE Transactions on Circuits and Systems, vol. 36, No. 7, Jul. 1989, pp. 937-947.

International Search Report and Written Opinion dated Mar. 17, 2010, for related International Application No. PCT/US2009/046514.

\* cited by examiner

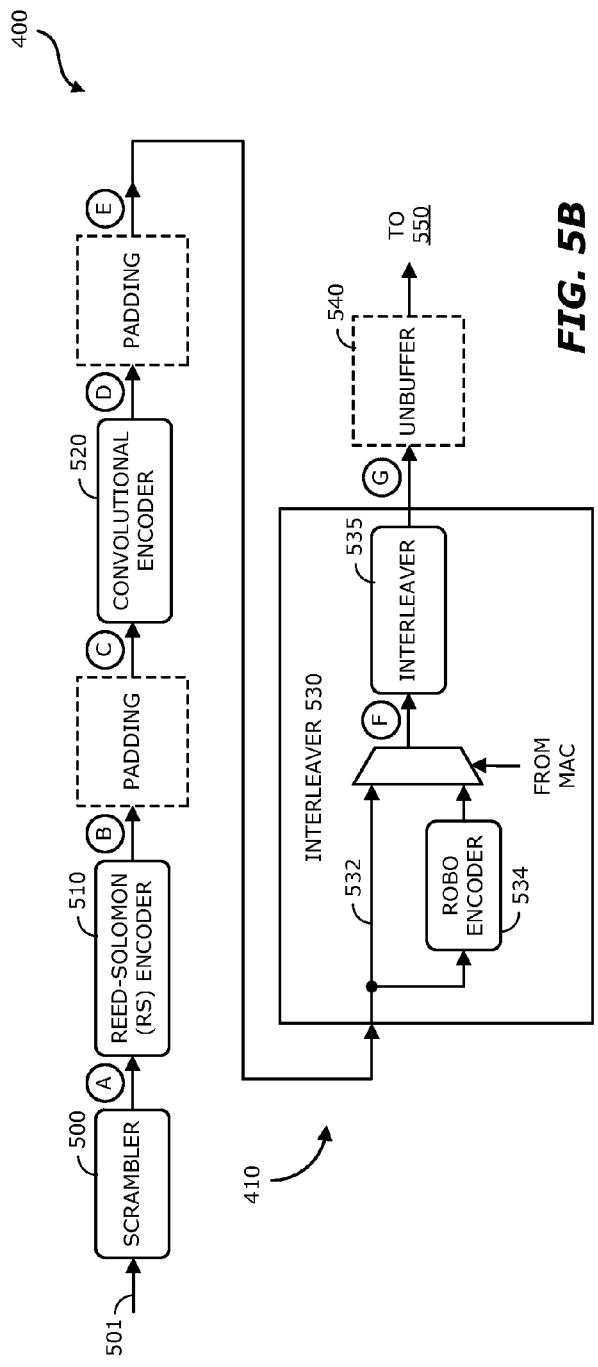
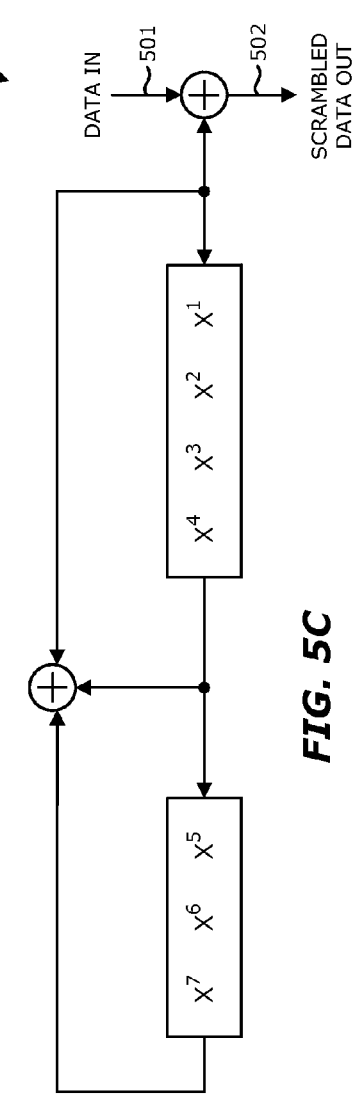
FIG. 5B
FIG. 5C

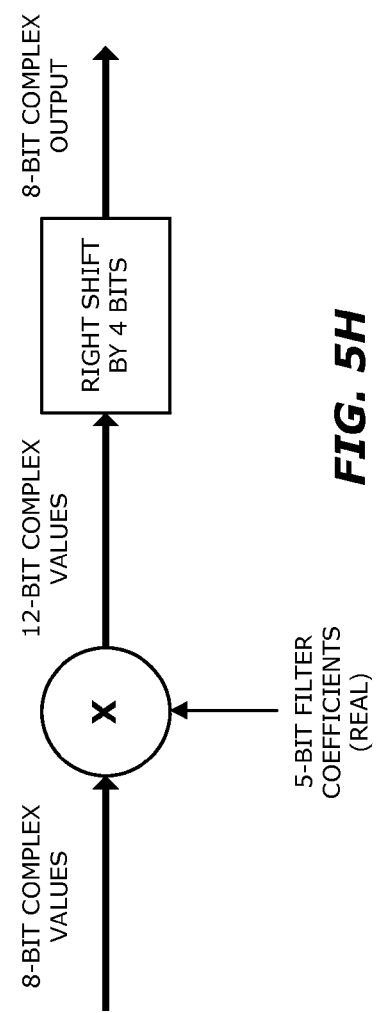
FIG. 5G
FIG. 5H
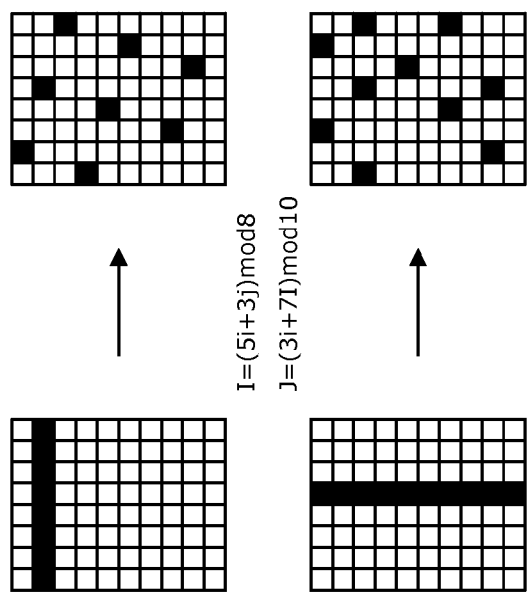
FIG. 5F

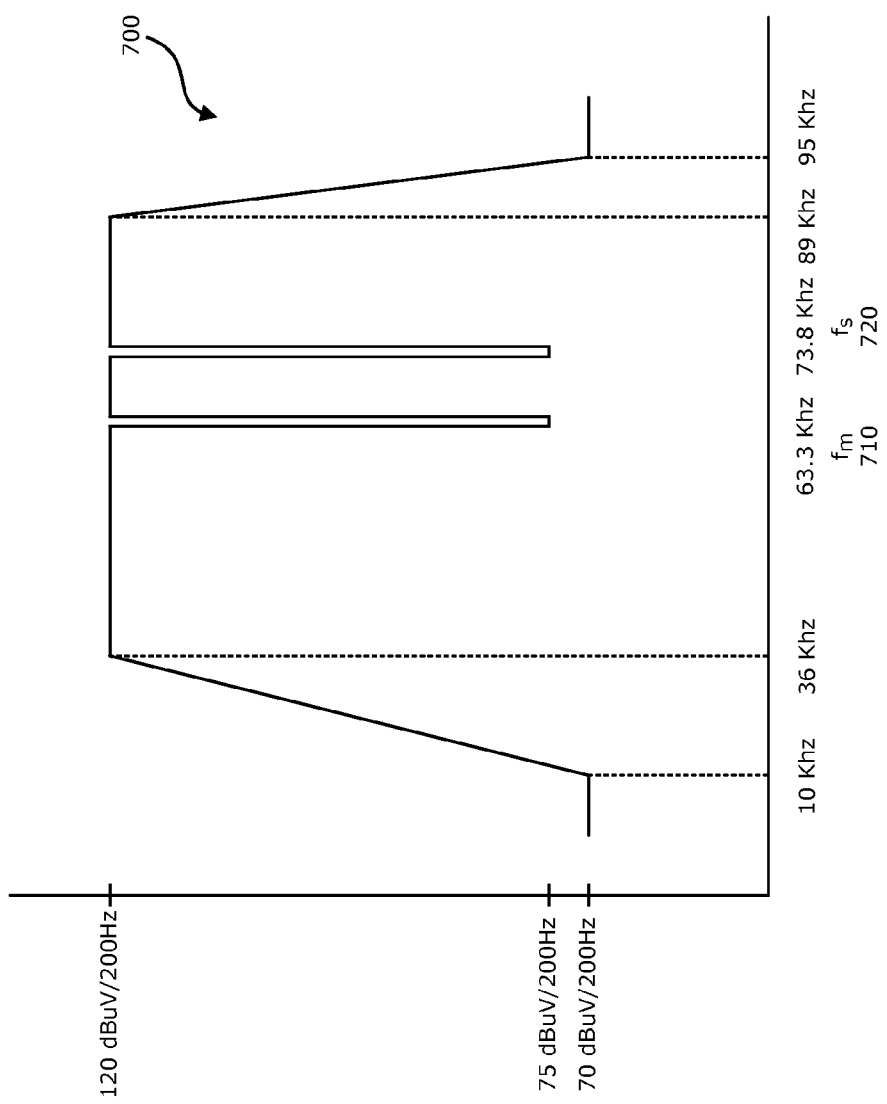

TRANSMITTER AND METHOD FOR APPLYING MULTI-TONE OFDM BASED COMMUNICATIONS WITHIN A LOWER FREQUENCY RANGE

CROSS-REFERENCE TO RELATED APPLICATIONS

This application is a continuation of U.S. patent Ser. No. 12/795,537, filed Jun. 7, 2010. This application claims the benefit of U.S. Provisional Application No. 61/186,627, filed on Jun. 12, 2009. The disclosures of the above applications are incorporated herein by reference in their entirety.

FIELD

Embodiments of the invention generally relate to a field of communications over a power line. More specifically, one embodiment of the invention relates to a system and method for applying multi-tone, orthogonal frequency division multiplexing (OFDM) based communications over a prescribed frequency region.

GENERAL BACKGROUND

For many years, both direct current (DC) and alternating current (AC) power lines have been used in order to transfer data from one device to another. Recently, there has been a growing need for new data transmission services and applications that are more reliable and support higher data rates over these power lines. For instance, remote metering, smart grids, industrial and home automation are merely some of the upcoming applications that are currently using power lines to support data communications and greater use of these power lines is expected.

One primary disadvantage in using power lines for data transfer is that power lines are hostile environments. In fact, communication channels supported by these AC power lines tend to experience severe non-linear behavior. In particular, channel characteristics and parameters may vary due to changes in frequency, location, time and even the type of equipment deployed. As an example, the impedance of a power line may appear to be 1-2 ohms (Ω), but as the frequency of signaling applied to the power line increases, the impedance of the power line also increases. This increased impedance causes increased signal noise that may hamper proper detection of the data at an intended destination.

FIG. 1 illustrates an exemplary noise power distribution 100 with frequency bands 110-112 supported by European (CELENEC), United States (FCC) and Japan (ARIB) power line standards respectively, as outlined in Table 1.

TABLE 1

| STANDARDS | LOW FREQ (KHz) | HIGH FREQ (KHz) |
|---|---|---|
| FCC | 10 | 480 |
| ARIB | 10 | 450 |
| CELENEC A | 9 | 95 |
| CELENEC B | 95 | 125 |
| CELENEC C | 125 | 140 |
| CELENEC B, C | 95 | 140 |

As illustrated in FIG. 1, a low frequency region from three kilohertz (3 kHz) to 500 kHz is especially susceptible to interference such as narrowband interference and/or intersymbol interference (ISI), which may occur if orthogonal frequency division multiplexing (OFDM) is used as the selected data transmission scheme.

OFDM is a multi-carrier modulation scheme that subdivides the available frequency spectrum into a number of narrowband channels (e.g., around 100 channels). The carriers for each channel may be spaced much closer together than Frequency Division Multiplexing (FDM) for example, because each carrier is configured to be orthogonal to its adjacent carriers. This orthogonal relationship may be achieved by setting each carrier to have an integer number of cycles over a symbol period. Hence, theoretically, there is no interference between the carriers themselves, albeit interference caused by environmental conditions may exist.

Besides interference, the low frequency region is highly susceptible to impulsive noise and group delay. "Impulsive noise" is characterized as a short peak pulse substantially less than one second (e.g., a few microseconds) and with a sharp rise time above the continuous noise level experienced by the signal. "Group delay" is a measure of the rate of change of the phase with respect to frequency. As an effect of non-constant group delay, phase distortion will occur and may interfere with accurate data recovery.

Prior power line communications have virtually avoided using OFDM-based communication techniques within the lower frequency region. One reason for such avoidance can be ascertain by review of the noise power distribution of FIG. 1. Between 10 kHz and 148 kHz (Celenec bands shown as region A 110), the effects of noise on an input signal of a given frequency level is about 10-30 decibels (dB) stronger than the noise experienced by signals at approximately 250 kHz as represented in region B 120. Moreover, the channel frequency response varies drastically within the region between 10 kHz-150 kHz, resulting in severe amplitude and phase distortion.

SUMMARY

A method to detect a phase connection of a receiver of a power line communication system includes providing a first connection between a transmitter and one phase of a multi-phase power line. A zero crossing of a first signal provided by the first connection is detected. A first timestamp is generated before a packet is transmitted by the transmitter. A value of the first timestamp is based on the zero crossing of the first signal provided by the first connection. The first timestamp is added to a header of the packet. The packet is sent over the power line communications system to the receiver. A second connection is provided between the receiver and one phase of the multi-phase power line. A zero crossing of a second signal provided by the second connection is detected. A second timestamp is generated when the packet is received by the receiver. A value of the second timestamp is based on the zero crossing of the second signal. The value of the first timestamp is compared to the value of the second timestamp to determine whether the one phase of the first connection is the same as the one phase of the second connection.

In other features, the zero crossing of the first signal resets a first count and wherein the value of the first timestamp is based on the first count. The zero crossing of the second signal resets a second count. The value of the second timestamp is based on the second count.

In other features, the method includes generating a phase differential based on a difference between the second count and the first count. The method includes generating a phase differential based on a difference between the value of the second timestamp and the value of the first timestamp. The method includes generating a phase differential based on a difference between the second count less a detection delay and the first count less a transmission delay. The method includes generating a phase differential based on a difference between the value of the second timestamp less a detection delay and the value of the first timestamp less a transmission delay.

In other features, the method includes generating a phase differential by calculating a difference between the second count and the first count and by dividing the difference by 3. The method includes generating a phase differential by calculating a difference between the value of the second timestamp and the value of the first timestamp and by dividing the difference by 3. The method includes generating a phase differential by calculating a difference between the second count less a detection delay and the first count less a transmission delay and by dividing the difference by 3. The method includes generating a phase differential by calculating a difference between the value of the second timestamp less a detection delay and the value of the first timestamp less a transmission delay and by dividing the difference by 3.

A system comprises a transmitter device including a first connection to one phase of a multi-phase power line. The transmitter includes a zero crossing detector that detects a zero crossing of a first signal provided by the first connection. A timestamp generator generates a first timestamp before a packet is transmitted by the transmitter, wherein the value of the first timestamp is based on the zero crossing of the first signal provided by the first connection. A packet transmitter adds the first timestamp to a header of the packet and transmits the packet over the power line. A receiver includes a second connection between the receiver and one phase of the multi-phase power line. The receiver further includes a zero crossing detector that detects a zero crossing of a second signal provided by the second connection. A timestamp generator generates a second timestamp when the packet is received by the receiver, wherein the value of the second timestamp is based on the zero crossing of the second signal. A phase detector compares the value of the first timestamp to the value of the second timestamp to determine whether the one phase of the first connection is the same as the one phase of the second connection.

In other features, the timestamp generator of the transmitter includes a counter that provides a first count that is reset by the zero crossing of the first signal, wherein the value of the first timestamp is based on the first count. The timestamp generator of the receiver includes a counter that provides a second count that is reset by the zero crossing of the second signal, wherein the value of the second timestamp is based on the second count.

In other features, the phase detector generates a phase differential based on a difference between the second count and the first count. The phase detector generates a phase differential based on a difference between the value of the second timestamp and the value of the first timestamp. The phase detector generates a phase differential based on a difference between the second count less a detection delay and the first count less a transmission delay. The phase detector generates a phase differential based on a difference between the value of the second timestamp less a detection delay and the value of the first timestamp less a transmission delay.

In other features, the phase detector generates a phase differential by calculating a difference between the second count and the first count and by dividing the difference by 3. The phase detector generates a phase differential by calculating a difference between the value of the second timestamp and the value of the first timestamp and by dividing the difference by 3. The phase detector generates a phase differential by calculating a difference between the second count less a detection delay and the first count less a transmission delay and by dividing the difference by 3. The phase detector generates a phase differential by calculating a difference between the value of the second timestamp less a detection delay and the value of the first timestamp less a transmission delay and by dividing the difference by 3.

BRIEF DESCRIPTION OF THE DRAWINGS

Features and advantages of embodiments of the invention will become apparent from the following detailed description in which:

FIGS. 5A-5H illustrate more detailed embodiments of a transmitter of the networked device.

FIG. 7A illustrates an exemplary embodiment of a signal spectrum provided by the transmitter of FIG. 4 using adaptive notching.

DETAILED DESCRIPTION

Embodiments of the invention set forth in the following detailed description generally relate to methods, apparatus, software, and systems for applying multi-tone orthogonal frequency division multiplexing (OFDM) based communications within a prescribed frequency band such as between 10 kHz and 600 kHz. According to one embodiment of the invention, the prescribed frequency band may involve frequencies less than 500 kHz and is programmable. For instance, the prescribed frequency band may be within 3 kHz-148 kHz (Celenec, European standard); 10 kHz-480 kHz (FCC, United States standard); 10 kHz-450 kHz (ARIB, Japanese standard) or the like. Of course, the invention may be applicable to chosen frequency bands greater than 500 kHz.

Of course, it is contemplated that a combination of a feedback analog automatic gain control (AGC) followed by a digital AGC, tone mapping module and adaptive notching module (described below) may be adapted to handle communications through a HV/LV transformer.

In the following description, certain terminology is used to describe certain features of the invention. For example, the terms "logic" and "module" broadly represent hardware, software, firmware or any combination thereof. The term "power line" generally represents a medium adapted to carry direct current (DC) or alternating current (AC).

Figure 1:
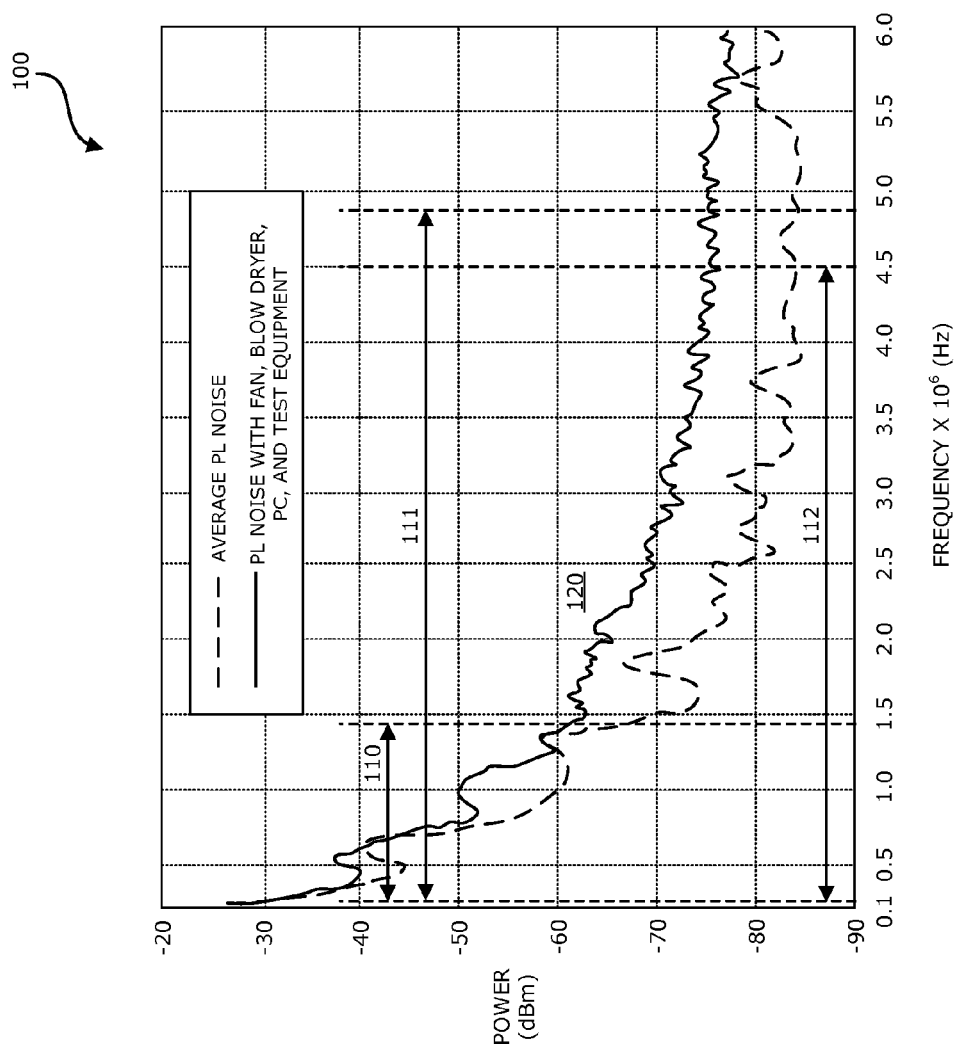
FIG. 1 is an exemplary depiction of noise power distribution over a power line.
Figure 2A:
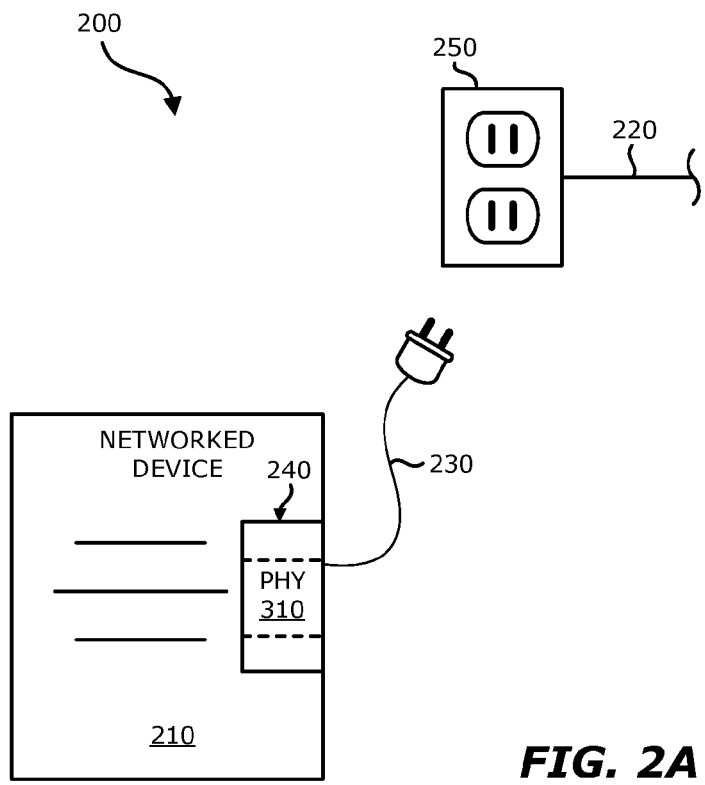
FIGS. 2A and 2B are exemplary block diagrams of a networked device utilizing power lines for data transfer.

Referring now to FIG. 2A, a general embodiment of a network system 200 adapted to support multi-tone OFDM base communications is shown. Herein, a networked device 210 is connected to a power line 220 via a power cord 230. In general, "networked device" 210 is any equipment that is capable of transmitting and/or receiving information over power line 220. Examples of different types of networked devices include, but are not limited or restricted to a computer, a router, an access point (AP), a wireless meter, a networked appliance, an adapter, or any device supporting connectivity to a wired or wireless network.

According to one embodiment of the invention, networked device 200 includes Physical Layer (PHY) logic 240 that is adapted to process data for transmission over power cord 230 to power line 220. PHY logic 240 comprises circuitry and perhaps software to support electrical and mechanical functionality with power line 220, where these electrical or mechanical connections provide an interface to format signals for transmission or receipt over power lines 220. Such functionality may include, but is not limited or restricted to digital-to-analog conversion, analog-to-digital conversion, modulation, and/or error correction. This functionality is described in further detail with respect to the receiver and transmitter modules set forth in FIGS. 4 & 8.

Figure 3:
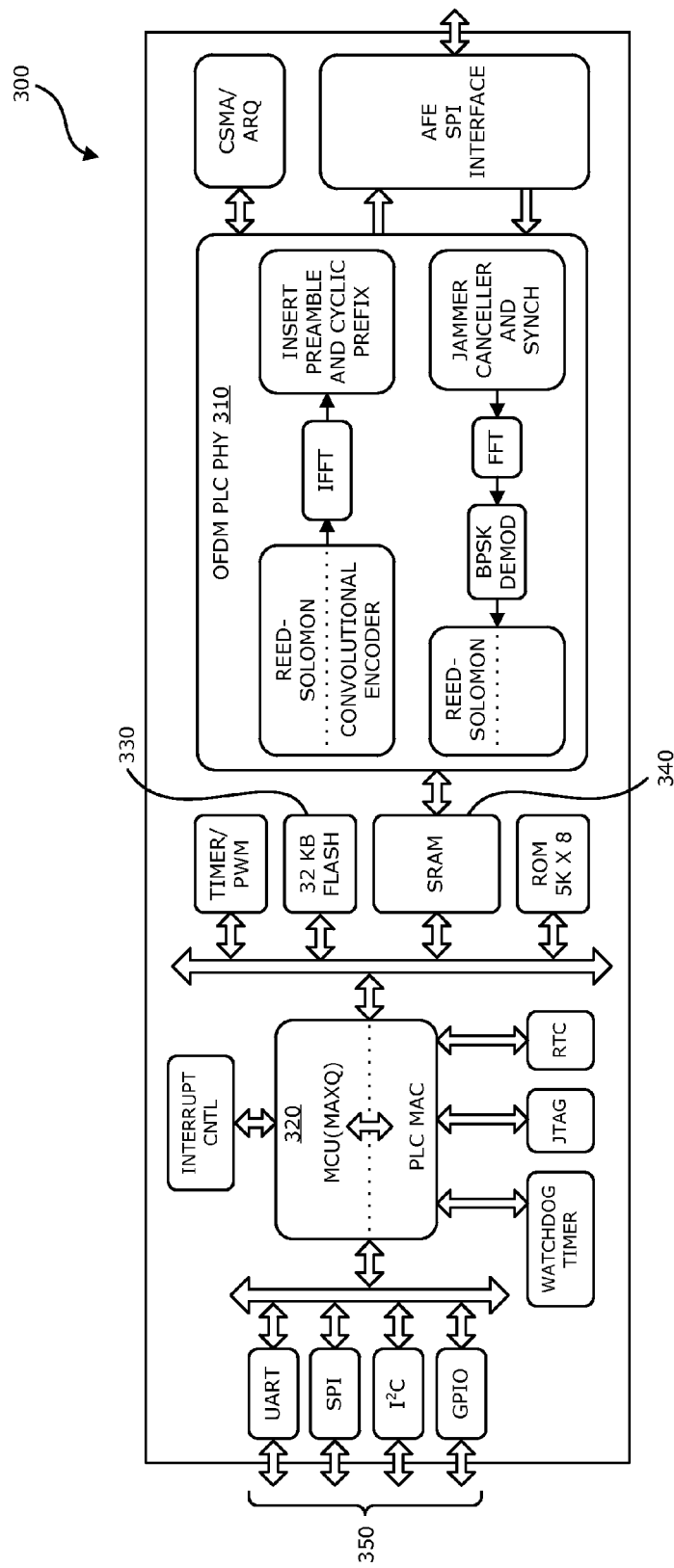
FIG. 3 is an exemplary block diagram of an integrated circuit that controls communications over a power line of FIG. 2A and/or FIG. 2B.

According to one embodiment of the invention, PHY circuitry 240 may include logic, such as an OFDM Power Line Communication Physical Layer (OFDM PLC PHY) circuitry 310 of FIG. 3, which enables network connectivity over power lines 220 via power cord 230. Power cord 230 includes a two-prong, or three-prong plug that is placed into a wall socket 250, which is connected to an end of power line 220.

Figure 2B:
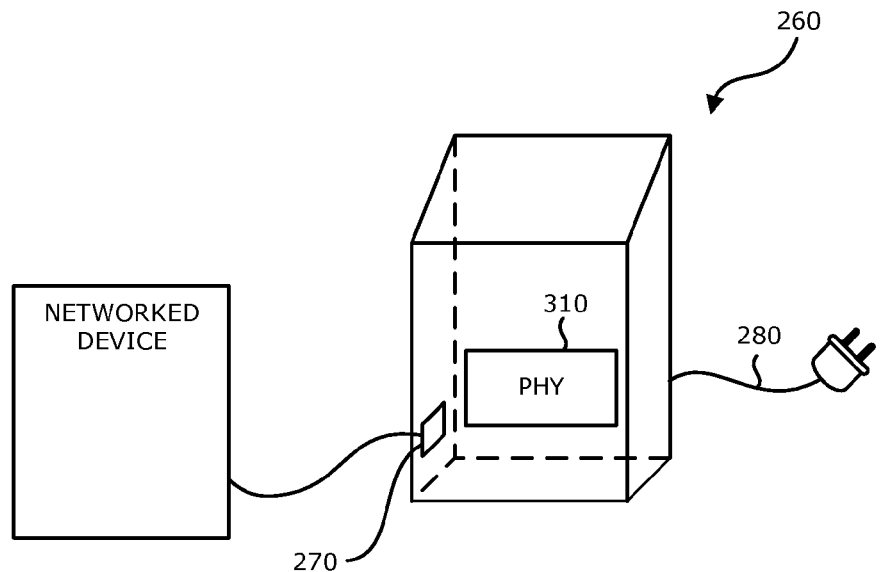

It is contemplated that networked device 200 may be configured as an adapter 260 in communication with a device (e.g., computer, AP, etc.) that is to be connected to the power line network but does not feature the necessary PHY circuitry. As shown in FIG. 2B, adapter 260 is implemented with OFDM PLC PHY circuitry 310 and operates as an intermediary between the device and power line 220. For this implementation, it is contemplated that adapter 260 includes a connector 270 that enables communications with the device and a power cord 280 that establishes a connection with power line 220. Connector 270 may include any serial and/or parallel port such as, for example, a RJ-11 jack, Universal Serial Bus (USB) port, or the like.

Referring now to FIG. 3, an exemplary embodiment of an integrated circuit that controls communications over power line 220 of FIGS. 2A and 2B is shown. Herein, a combination of physical (PHY) and media access control (MAC) layers is implemented within a single integrated circuit 300. Herein, the PHY layer, in particular OFDM PLC PHY circuitry 310, uses OFDM technology with PSK-type modulation (e.g., DBPSK, DQPSK, D8PSK, etc.) and forward error correction (FEC) to provide robust communication in the presence of narrowband interference, group delay, jammer signals, impulsive noise, and frequency-selective attenuations. OFDM PLC PHY circuitry 310 includes a transmitter and/or a receiver as described below.

As shown, OFDM PLC PHY circuitry 310 is controlled by a microcontroller 320 (e.g., 16-bit RISC MAXQ® microcontroller) that is placed on-chip as well. Moreover, integrated circuit 300 further includes flash memory 330, static random access memory 340, and serial interfaces 350 (e.g., universal asynchronous receiver/transmitter "UART", System Packet Interface "SPI", Inter-Integrated Circuit "I²C") for communication among devices on the power line network.

Figure 4:
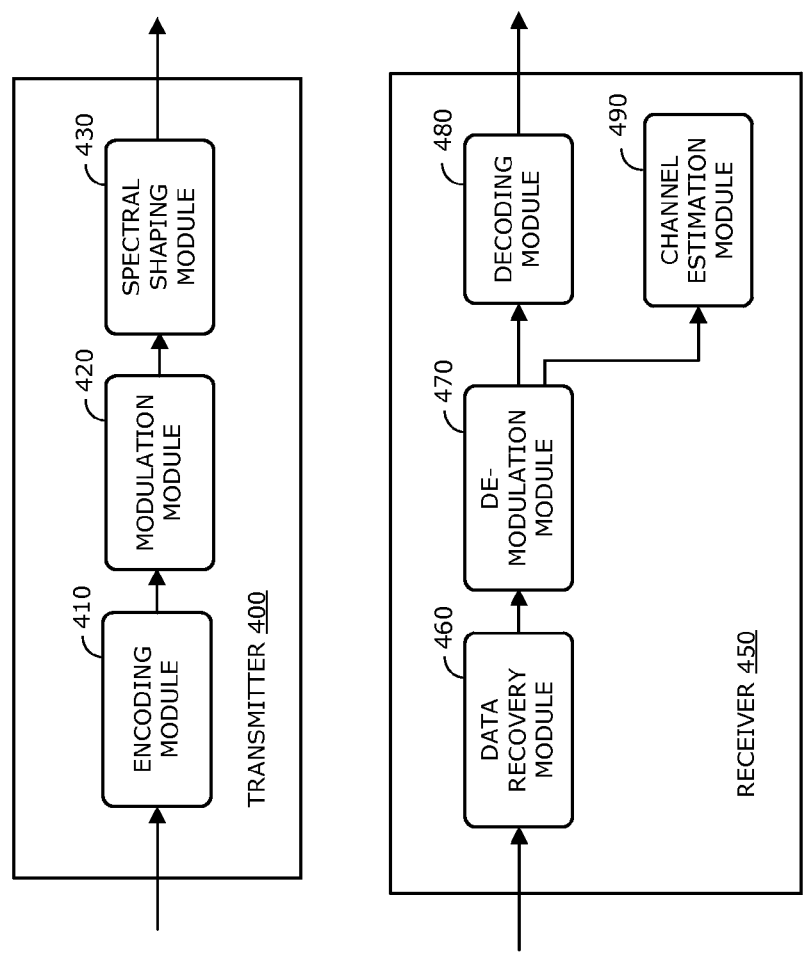
FIG. 4 illustrates an exemplary embodiment of transmitter and/or receiver functionality of the networked device as described in FIG. 2A and/or FIG. 2B.

Referring to FIG. 4, an exemplary embodiment of a transmitter 400 integrated within OFDM PHY circuitry 310 and adapted for communications with an OFDM receiver is shown. Herein, according to this embodiment of the invention, transmitter 400 comprises a plurality of modules including an encoding module 410, a modulation module 420, and a spectral shaping module 430.

Figure 5A:
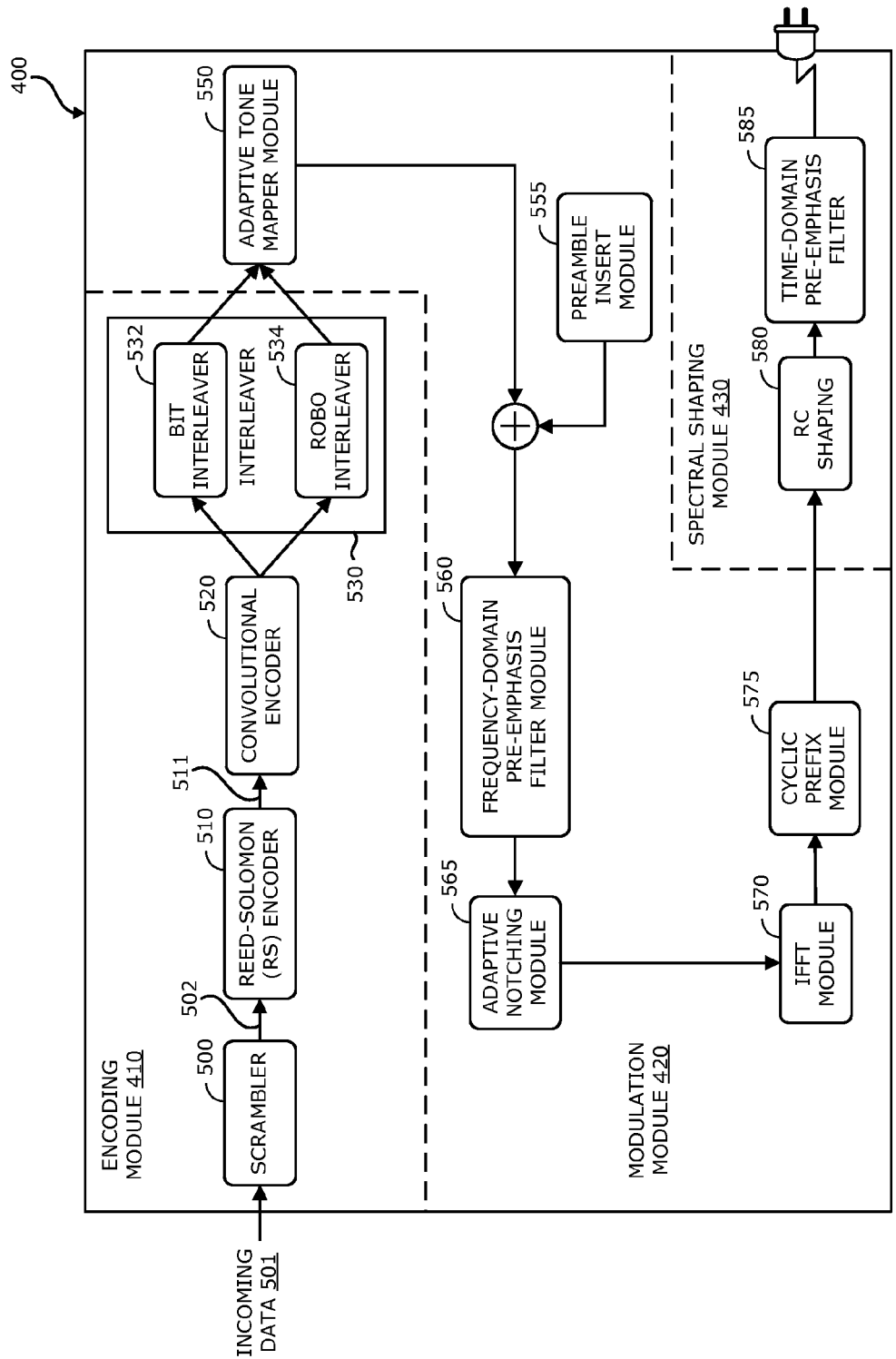

As shown in FIGS. 5A and 5B, an exemplary embodiment of transmitter 400, especially encoding module 410, is shown. In general, a functionality of encoding module 410 is to randomize the incoming data and to insert error correction data into the transmitted signal. Herein, for this embodiment of the invention, encoding module 410 comprises a scrambler 500, a Reed-Solomon encoder 510, a convolutional encoder 520 and an interleaver sub-system 530 that may operate in either a Normal mode or a Robust (ROBO) mode, where interleaver sub-system 530 performs repetitive encoding when operating in a ROBO mode. In other words, a ROBO mode provides extra redundancy to facilitate communications in frequency selective, severely attenuated channels. Optional padding may be performed by encoding module 410.

Transmitter 400 is adapted to receive its input bits in a packet from the Media Access (MAC) Layer. Encoding module 410 may add parity bits to the data and the packet increases in size as it passes through encoding module 410. At the end of encoding module 410, the final packet may be segmented into small packet(s) by "Un-Buffer" block 540 of FIG. 5B so that each small packet may be fitted into one OFDM symbol. The size of this small packet depends on the number of carriers used in each OFDM symbol.

For example, in FCC band, the symbol size becomes equal to 100 bits. In order to understand the size of data as well as signal dimensions at each various points in the transmitter 400, the number of bits carried by a packet (e.g., PHY frame) may be obtained as set forth by equation (1):

$$N_F = N_G = Ncarr \times Ns \quad (1)$$

Herein, "$N_F$" and "$N_G$" represent the size of packet (signal) at points (F) and (G) of FIG. 5B, respectively. Where "Ncarr" is the number of carriers in each OFDM symbol and "Ns" is the number of symbols per PHY frame. Note that the interleaver does not change the size of packet. The number of bits at point (E) may be computed by equation (2):

$$N_E = N_F \times R \quad (2)$$

Herein, the value "R" may be one "1" for Normal mode and a fraction based on repetition level for different ROBO modes (e.g., "¼" for Robust mode or "⅙" for Super Robust (S-Robust) mode). In order to determine M, the number of zeros that may be needed to pad at the output of convolutional encoder 520, the maximum number of Reed-Solomon (RS) bytes needs to be computed. The maximum number of RS bytes (MaxRSbytes) at the output of RS encoder 510 can be obtained as shown in equation (3):

$$MaxRSbytes = floor((N_E \times CCRate - CCZeroTail)/8) \quad (3)$$

Where "CCRate" and "CCZeroTail" are the convolutional code rate (½) and the number of zeros to be added to the input of convolutional encoder 520 (to terminate the states to zero state), respectively. The denominator "8" refers to the length of each RS word that is one byte. Therefore, the value of "M" may be obtained by (see Table 2 below):

$$M = N_E - ((\text{Max}RS\text{bytes} \times 8) + 6) \times 2 \quad (4)$$

And the number of bits at point (D), (C) and (B) now may be calculated by:

$$N_D = N_E - M$$

$$N_c = N_D/2$$

$$N_E = N_c - 6$$

TABLE 2 # of zeroes padded after convolutional encoder

| | ROBO (bits) | Normal(bits) |
|---|---|---|
| FCC | M = 12 | M = 4 |
| ARIB | M = 6 | M = 12 |
| CELENEC A | M = 12 | M = 4 |
| CELENEC B | M = 4 | M = 4 |
| CELENEC C | M = 4 | M = 4 |
| CELENEC B, C | M = 4 | M = 4 |

Finally, considering the fact the number of parity bytes in RS code may be equal to 8, the packet size delivered by MAC to the physical layer may be given by:

$$N_A = (N_E/8 - 8) \times 8$$

The input packet to the physical (PHY) layer for various band and both Normal and ROBO modes may be summarized in Table 3 below.

TABLE 3

Packet size delivered by MAC layer to PHY layer

| | ROBO (bits) | Normal (bits) |
|---|---|---|
| FCC | 424 | 1928 |
| ARIB | 392 | 1784 |
| CELENEC A | 304 | 1448 |
| CELENEC B | 168 | 888 |
| CELENEC C | 168 | 888 |
| CELENEC BC | 288 | 1368 |

Referring still to FIGS. 5A and 5B, scrambler 500 randomly distributes the incoming data. For instance, according to one embodiment of the invention, incoming data 501 may undergo an exclusive-OR (XOR) operation with a repeating pseudo-random sequence to produce scrambled data 502 as shown in FIG. 5C. Herein, according to one embodiment of the invention, a generator polynomial $S(x) = x^7 + x^4 + 1$ is used where the bits in scrambler 500 are initialized to all ones at the start of processing each PHY frame.

Thereafter, scrambled data 502 is routed to a first error correction scheme, namely a Reed-Solomon (RS) encoder 510. RS encoder 510 is responsible for recovering data destroyed by impulsive noise. Hence, RS encoder 510 recovers data associated with a tone experiencing impulsive noise and outputs such data 511 to convolutional encoder 520.

Herein, according to one embodiment of the invention, data from scrambler 500 may be encoded by RS encoder 510 created by shortening the RS code (255,247, t=4) and (255, 239, t=8). The "RS symbol word length," namely the size of the data words used in the Reed-Solomon block, may be fixed at 8-bits. The value of t (number of word errors that can be corrected) can be either 4 or 8 for different standards. For CENELEC B&C and ROBO, the RS parity of 8-bytes (corresponding to t=4) should be used. The number of parity words in a RS-block is thus "2t" words.

The number of non-parity data words (bytes) in Reed-Solomon block may be provided in Table 4 below. The first bit in time from scrambler 500 may become the most significant bit "MSB" of that symbol. Each RS encoder input block (e.g., 247 symbols) is conceptually formed by one or more fill symbols ("00000000") followed by the message symbols. Output of RS encoder 510 (with fill symbols discarded) may proceed in time from first message symbol to last message symbol followed by parity symbols, with each symbol shifted out most significant bit first.

Code Generator Polynomial $g(x) = (x-\alpha_1)(x-\alpha^2)(x-\alpha_3) \ldots (x-\alpha^8)$ Field Generator Polynomial: $p(x) = x^8 + x^4 + x^3 + x^2 + 1$ (435 octal)

TABLE 4

RS encoder input/output packet size

| | Normal Mode $N_A/N_B$ (Bytes) | ROBO Mode $N_A/N_B$ (Bytes) |
|---|---|---|
| FCC | 241/249 | 53/61 |
| ARIB | 223/231 | 49/57 |
| CENELEC A | 181/189 | 38/46 |
| CENELEC BC | 171/179 | 36/44 |
| CENELEC B | 111/119 | 21/29 |
| CENELEC C | 111/119 | 21/29 |

The representation of $\alpha^0$ is "00000001", where the left most bit of this RS symbol is the MSB and is first in time from scrambler 500 and is the first in time out of RS encoder 510.

Next, convolutional encoder 520 is responsible for recovering those portions of data 511 that are affected by white noise present within data 511 due to Gaussian noise from the environment. This white noise causes degradation of the data associated with each tone. While the degradation of the data cannot be eliminated, its effect can be mitigated through forward error correction (FEC) techniques that are performed by convolutional encoder 520.

Figure 5D:
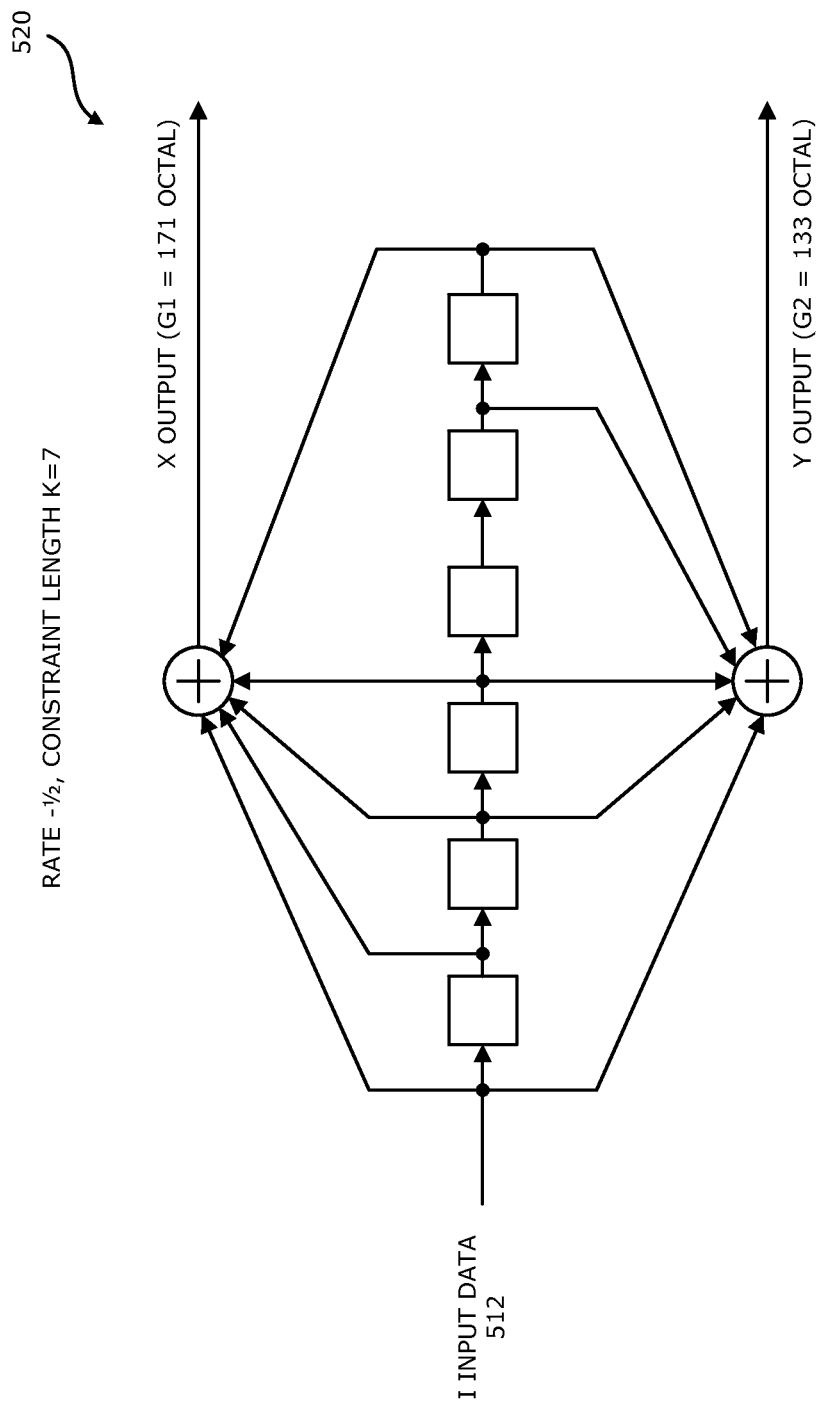

Herein, according to one embodiment of the invention, the bit stream at the output of the Reed-Solomon block may be encoded with a standard rate=½, K=7 convolutional encoder 520. The tap connections are defined as x=0b1111001 and y=0b1011011, as shown in FIG. 5D.

When the last bit of data to convolutional encoder 520 has been received, convolutional encoder 520 inserts six tail bits, which may be required to return convolutional encoder 520 to the "zero state". This may improve the error probability of the convolutional decoder, which relies on future bits when decoding. The tail bits may be defined as six zeros. The number of bits at the input and the output of convolutional encoder 520 may be given in Table 5.

TABLE 5

Convolutional encoder input/output packet sizes

| | Normal Mode NA/NB (bits) | ROBO Mode NA/NB (bits) |
|---|---|---|
| FCC | 1998/3996 | 494/988 |
| ARIB | 1854/3708 | 462/924 |
| CENELEC A | 1518/3036 | 374/748 |
| CENELEC BC | 1438/2876 | 358/716 |

TABLE 5-continued

Convolutional encoder input/output packet sizes

|  | Normal Mode NA/NB (bits) | ROBO Mode NA/NB (bits) |
|---|---|---|
| CENELEC B | 958/1916 | 238/476 |
| CENELEC C | 958/1916 | 238/476 |

Next, interleaver sub-system 530 is used to intelligently randomize the data in frequency (sub-carriers) and time in order to achieve frequency and time diversity. In other words, data may be repositioned in different frequency channels and even in different symbols (OFDM). Interleaver sub-system 530 generally is adapted to operate in two different modes: Normal mode 532 and at least one Robust (or ROBO) mode 534. In Normal mode, interleaver sub-system 530 randomizes the data in frequency and time. In ROBO mode, however, interleaver sub-system 530 not only randomizes the data in frequency and time, but also facilitates communications over a degraded channel by reducing the data rate and performing repetition coding.

This repetition coding involves the operation of repeating the data bits from convolutional encoder 520 multiple times (e.g., four times for standard Robust mode and six times for S-Robust mode) and statistically placing these bits at different frequencies and within different symbols in order to increase reliability. Whether operating in Normal mode or any type of ROBO mode, interleaver sub-system 530 is controlled by microcontroller 320 of FIG. 3 based on signaling from a corresponding receiver that is currently in communications with transmitter 400. Such signaling is the result of the channel estimation module of the receiver measuring the SNR of the channel and using this information to decide the mode of operation. Thereafter, the receiver communicates this information for receipt by transmitter 400.

Figure 5E:
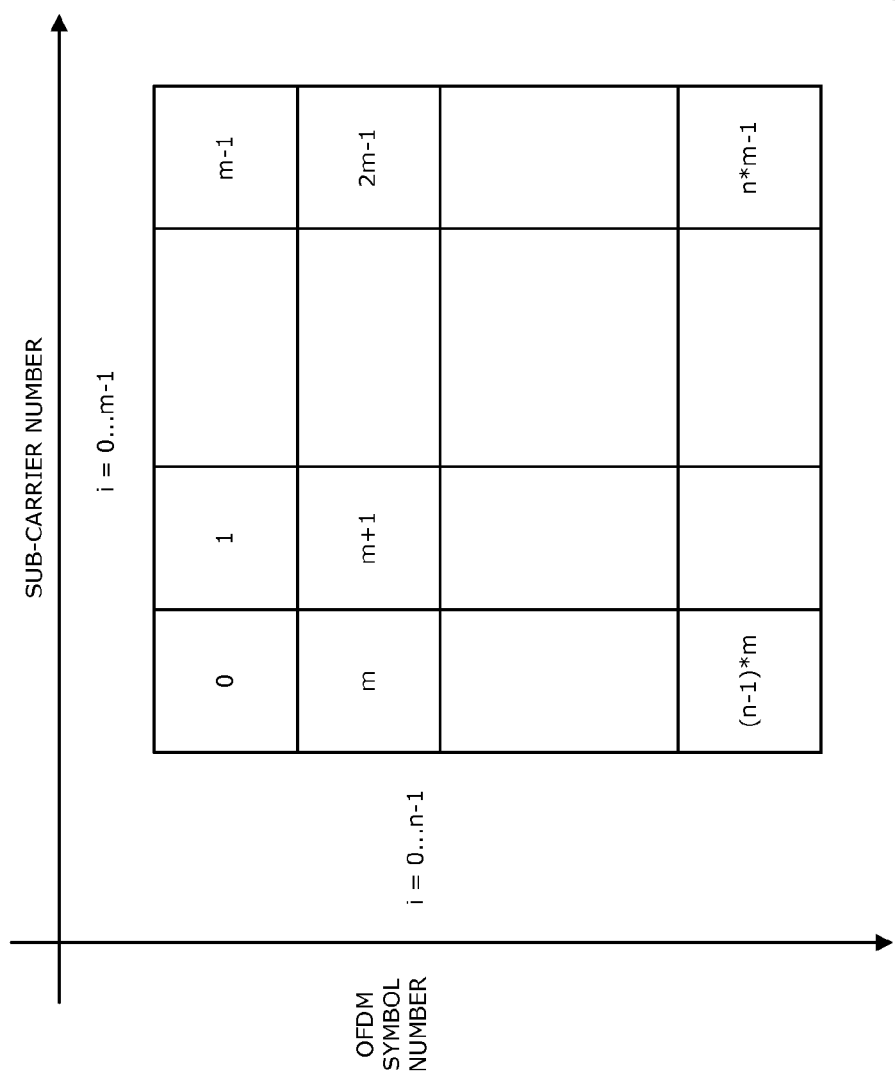

Herein, according to one embodiment of the invention, interleaver sub-system 530 may be used for both Normal and ROBO modes. As illustrated in FIG. 5E, this interleaver is designed such that it can provide protection against two different sources of errors:

A burst error that corrupts a few consecutive OFDM symbols

A frequency deep fade that corrupts a few adjacent frequencies for a large number of OFDM symbols To fight both problems at the same time, interleaving is done in two steps. In the first step, each column 536 is circularly shifted a different number of times. Therefore, a corrupted OFDM symbol is spread over different symbols. In the second step, each row 537 is circularly shifted a different number of times, which prevents a deep frequency fade from disrupting the whole column. The amount of circular shifts is determined by the parameters a, b, c, and d which are selected based on the number of sub-carriers in each OFDM symbol (m) as well as the number of OFDM symbols in each interleaving block (n). The figure below shows the order of bits as they are put in the interleaver buffer (i.e. row by row).

The relation between input and output indexes is determined from the following relations Original bit position $(i,j)$ where $i=0, 1, \ldots, m-1$ and $j=0, 1, \ldots, n-1$ Interleaved position $(I,J)$ where $I=(a*i+b*j) \% m$ and $J=(c*j+d*I) \% n$ NOTE: Good interleaving patterns will be generated only if $GCD(a,m)=GCD(b,m)=GCD(c,n)=GCD(d,n)=1$.

A simple search is done to find a good set of parameters based on m and n. FIG. 5F displays the spreading behavior of interleaver subsystem 530 in producing results 538 and 539 based upon interleaving row 537 and column 536 with m=8, n=10, a=5, b=3, c=3 and d=7.

Referring back to FIGS. 4 and 5A, modulation module 420 comprises an adaptive tone mapping module 550, preamble insert module 555, a frequency-domain pre-emphasis filtering module 560, an adaptive notching module 565, an inverse fast fourier transform (IFFT) module 570 and a cyclic prefix module 575.

Herein, adaptive tone mapping module 550 receives packets of data from interleaver 530 and uses PSK modulation to map bits of data to a corresponding analog frequency. More specifically, adaptive tone mapping module 550 estimates the SNR of the received signal sub-carriers and adaptively selects the usable tones and optimum modulation and code rate (including DBPSK, DQPSK, D8PSK and the Robust mode) to ensure reliable communication over a powerline channel. In general, adaptive tone mapping module 550 specifies what power level the remote transmitter shall use and what gain values it should apply for various sections of the spectrum. The per-tone quality measurement enables the network system to adaptively avoid transmitting data on sub-carriers with poor quality. Using a tone map indexing system, where the index is passed from receiver to transmitter and vice versa, allows the receiver to adaptively select which sub-carriers will be used for transmission and which ones will be used to send dummy data that the receiver networked device will ignore.

The goal of adaptive tone mapping is to allow the receiver networked device to achieve the greatest possible throughput given the channel conditions existing between them. In order to accomplish this goal, the receiver networked device is configured to inform the transmitter networked device which tones it should use to send data bits on, and which tones it should use to send dummy data bits that the receiver networked device shall ignore. The receiver networked device may be configured to also inform the transmitter networked device how much amplification or attenuation it should apply to each of the tones.

The transmitter networked device may request an estimation of a channel condition by setting a selected bit in the Frame Control Header. The receiver networked device has to estimate this particular communication link between two points and choose optimal PHY parameters. This information will be sent back to the transmitter networked device as a Tone Map Response 555. The format of Tone Map Response message 555 that is sent from the receiver networked device back to the transmitter networked device is shown in FIG. 5G.

The Tone Map Response message parameters are shown in Table 6.

TABLE 6

Tone Map Response message description

| Field | Byte | Bit number | Bits | Definition |
|---|---|---|---|---|
| TXRES | 0 | 7 | 1 | Tx Gain resolution corresponding to one gain step. 0:6 dB 1:3 dB |
| TXGAIN | 0 | 6-3 | 4 | Desired Transmitter gain specifying how many gain steps are requested. |
| TX_TMI[8:10] | 0 | 2-0 | 3 | TX Tone Map Index |

TABLE 6-continued

Tone Map Response message description

| Field | Byte | Bit number | Bits | Definition |
|---|---|---|---|---|
| TX_TMI[0:7] | 1 | 7-0 | 8 | TX Tone Map Index |
| TM[69-0] | 2 | 7-0 | 8 | Tone Map [7-0] |
|  | 3 | 7-0 | 8 | Tone Map [15-8] |
|  | 4 | 7-0 | 8 | Tone Map [23-16] |
|  | 5 | 7-0 | 8 | Tone Map [31-24] |
|  | 6 | 7-0 | 8 | Tone Map [39-32] |
|  | 7 | 7-0 | 8 | Tone Map [47-40] |
|  | 8 | 7-0 | 8 | Tone Map [55-48] |
|  | 9 | 7-0 | 8 | Tone Map [63-56] |
|  | 10 | 7-2 | 6 | Tone Map [69-64] |
| MOD | 10 | 1-0 | 2 | Modulation mode |
| TXCOEF[3:0] | 11 | 7-4 | 4 | Specifies number of gain steps requested for 10 kHz-20 kHz spectrum |
| TXCOEF[7:4] | 11 | 3-0 | 4 | Specifies number of gain steps requested for 20 kHz-30 kHz spectrum |
| TXCOEF[11:8] | 12 | 7-4 | 4 | Specifies number of gain steps requested for 30 kHz-40 kHz spectrum |
| TXCOEF[15:12] | 12 | 3-0 | 4 | Specifies number of gain steps requested for 40 kHz-50 kHz spectrum |
| TXCOEF[19:16] | 13 | 7-4 | 4 | Specifies number of gain steps requested for 50 kHz-60 kHz spectrum |
| TXCOEF[23:20] | 13 | 3-0 | 4 | Specifies number of gain steps requested for 60 kHz-70 kHz spectrum |
| TXCOEF[27:24] | 14 | 7-4 | 4 | Specifies number of gain steps requested for 70 kHz-80 kHz spectrum |
| TXCOEF[31:28] | 14 | 3-0 | 4 | Specifies number of gain steps requested for 80 kHz-90 kHz spectrum |

1. TX_TMI: TX Tone Map Index is a PHY parameters profile number that the receiver networked device assigns to the rest of the fields that are specified in Tone Map Response message 555. This index can be used as a part of Frame Control Header for further communication with a device that issued Tone Map Response message 555.
2. MOD: Parameter that specifies the desired modulation type. The receiver networked device computes the SNR of Tone Map Request message 555 that it receives from the transmitter networked device and decides which of the three modulation modes (DBPSK, DQPSK, D8PSK or Robust) it wants the receiver networked device to use when sending next data frame or Tone Map Request message. Table 7 lists the allowed bit values and their corresponding modulation modes.

TABLE 7

Modulation Method Field

| MOD Value | Interpretation |
|---|---|
| 00 | Robust Modulation |
| 01 | DBPSK Modulation |
| 10 | DQPSK Modulation |
| 11 | D8PSK or reserved MOD on transmit, receiver shall discard the MAC Management Entry and shall use the MAC entry length field to determine the number of octets to ignore before continuing to process the remainder of the Service Block |

3. TXRES: Parameter that specifies the transmit gain resolution corresponding to one gain step.
4. TXGAIN: Parameter that specifies to transmitter networked device the total amount of gain that it should apply to its transmitted signal. The value in this parameter shall specify the total number of gain steps needed. The receiver networked device computes the received signal level and compares it to a VTARGET (pre-defined desired receive level). The difference in dB between the two values is mapped to a 5-bit value that specifies the amount of gain increase or decrease that the transmitter networked device shall apply to the next frame to be transmitted. A "0" in the most significant bit indicates a positive gain value, hence an increase in the transmitter gain, and a "1" indicates a negative gain value, hence a decrease in the transmitter gain. A value of TXGAIN="0" informs the transmitter networked device to use the same gain value it used for previous frame.
5. TM: Parameter that specifies the Tone Map. The receiver networked device estimates the per-tone quality of the channel and maps each tone to a one-bit value where a value of "0" indicates to the transmitter networked device that dummy data should be transmitted on the corresponding sub-carrier while a value of "1" indicates that valid data should be transmitted on the corresponding sub-carrier.
6. TXCOEF: Parameter that specifies transmitter gain for each 10 kHz section of the available spectrum. The receiver networked device measures the frequency-dependent attenuation of the channel and may request the transmitter networked device to compensate for this attenuation by increasing the transmit power on sections of the spectrum that are experiencing attenuation in order to equalize the received signal. Each 10 kHz section is mapped to a 4-bit value where a "0" in the most significant bit indicates a positive gain value, hence an increase in the transmitter gain is requested for that section, and a "1" indicates a negative gain value, hence a decrease in the transmitter gain is requested for that section.

Thereafter, according to one embodiment, preamble insertion module 555 is responsible for inserting a preamble into the start of each PHY frame. The preamble is used in transmissions to identify that the frame has arrived and the type of modulation conducted on the data within the frame.

It is contemplated that every time a signal is transmitted over a power line, the signal will experience some attenuation, especially at the higher frequencies. Hence, in order to compensate for attenuation caused by channel characteristics, frequency-domain pre-emphasis filter module 560 is adapted to multiply complex elements received from adaptive tone mapping module 550 (e.g., complex frequency domain samples of an OFDM symbol) with corresponding filter coefficient values. Each of the filter coefficient values represents attenuation for one of the tones ranging from 0 dB up to 12 dB or higher, and such filter coefficient values can be dynamic or static in nature.

More specifically, frequency-domain pre-emphasis filter module 560 may include a multiplexer that is adapted to multiply the complex frequency domain samples of an OFDM symbol with 128 real filter coefficients, then conduct four (4) right shifts at the output. According to one embodiment of the invention, the filter coefficients are 5-bits representing unsigned values from 0 h to 10 h, and the filter coefficients is not be allowed to have values larger than 10 h. Of course, in other embodiments, other bit sizes may be used. For this embodiment, the filter multiplies the first 128 frequency-domain complex samples of an OFDM symbol with the 128 real coefficients of the filter. The rest of the 128 frequency-domain samples of the OFDM symbol typically are set to zero and are not be multiplied by the filter coefficients. As shown in FIG. 5H, input complex samples may be 8 bits each while the filter coefficients may be 5 unsigned bits each. Since the maximum allowed value of any filter coefficients may be 10 h, the output of the multiplication may be 12 bits (not 13 bits). The output may then be right shifted by 4 to get a final output of 8 bits that may be used as input to the IFFT.

The filter coefficient values may vary from 0 to 16, and since four (4) right shifts are performed at the output. Hence, frequency-domain pre-emphasis filter module 560 may provide the following attenuation for any of the 128 carriers:

| Scaling factor | attenuation in dB |
| --- | --- |
| 16/16 | 0 dB |
| 15/16 | −0.53 dB |
| 14/16 | −1.16 dB |
| 13/16 | −1.8 dB |
| 12/16 | −2.5 dB |
| 11/16 | −3.25 dB |
| 10/16 | −4 dB |
| 9/16 | −5 dB |
| 8/16 | −6 dB |
| 7/16 | −7.2 dB |
| 6/16 | −8.5 dB |
| 5/16 | −10.1 dB |
| 4/16 | −12 dB |
| 3/16 | −14.5 dB |
| 2/16 | −18 dB |
| 1/16 | −24 dB |
| 0/16 | −infinite |

Figure 6:
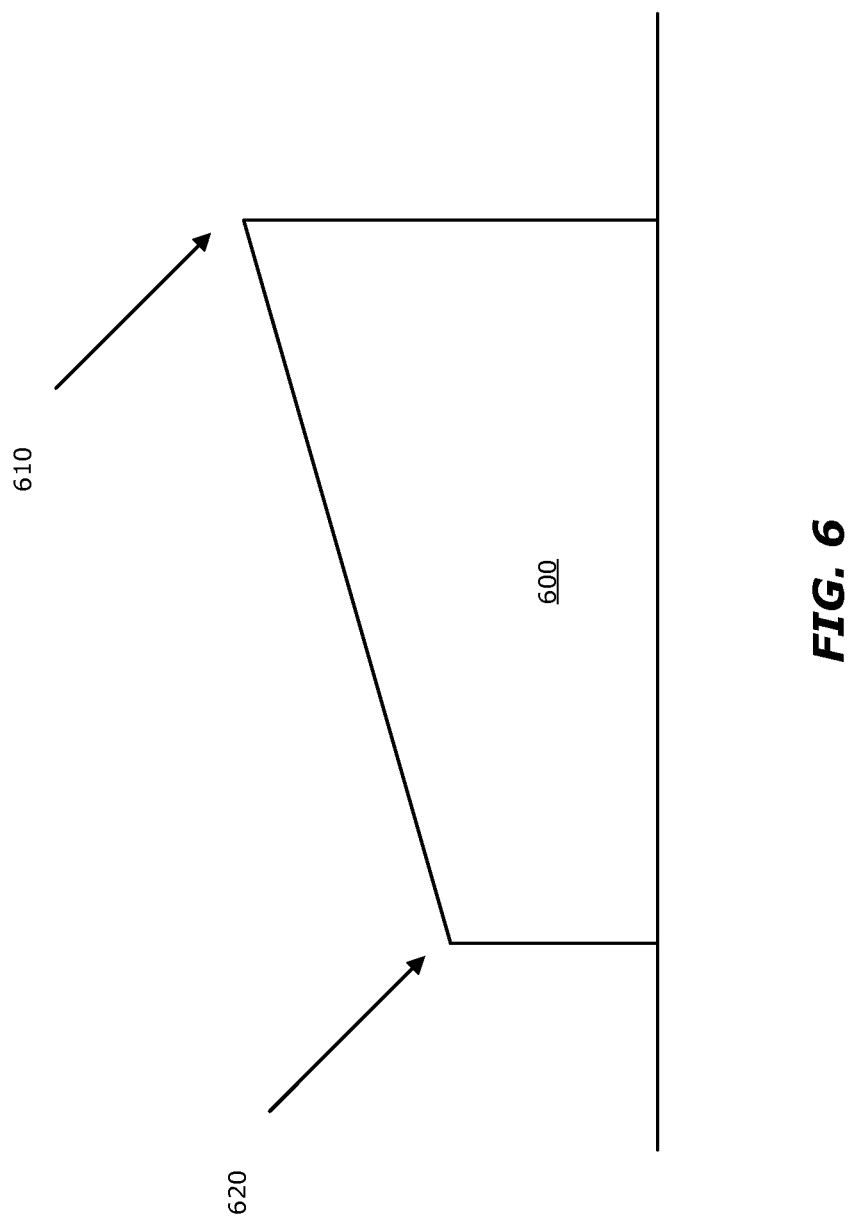
FIG. 6 illustrates the operations of a frequency-domain pre-emphasis filter implemented within the transmitter of the networked device of FIG. 5A.

For instance, as an illustrative example shown in FIG. 6, an OFDM signal 600 propagating through the power line may be attenuated by as much as 12 dB during transmission through the power line. As a result, the frequency-domain pre-emphasis filter adjusts for such attenuation so that the attenuated portions of OFDM signal 600 are adjusted for the 12 dB loss. As a result, for this example, the higher tone frequencies 610 associated with OFDM signal 600 is attenuated to be two times larger in than lower tone frequencies 620 of signal 600. The compensation is normally static in nature based on prior testing, although it may be dynamic in nature or programmable.

Referring back to FIG. 5A, adaptive notching module 565 is configured to utilize data from frequency-domain pre-emphasis filter module 560 in order to place programmable notches in the frequency spectrum without any extra filtering. Hence, the adaptive notching scheme enables transmitter 400 to avoid data transmission over selected frequencies and may enable compliance with regional spectral/interference regulations. This notching may occur at the ends of the frequency spectrum, or may occur at selected frequencies within the frequency spectrum itself.

For instance, adaptive notching module 565 operates as a multiplier to "zero out" tones within the N-complex elements of the IFFT input vector. Based on a user-defined table, microcontroller 320 located within OFDM PLC PHY circuitry 300 of FIG. 3 is adapted to control the operations of adaptive notching module 565 of FIG. 5A by altering the filter coefficient values. This creates a different mapping table that is stored into registers accessed by the adaptive tone mapping module 550. The new mapping table will exclude certain frequency regions within a selected frequency band.

For instance, as an illustrative example, the CELENEC A standard supports a frequency spectrum ranging between 9 kHz and 95 kHz at a sample rate of 1.2 megahertz (Mhz). In order to notch all frequencies below 20 kHz, adaptive notching module 565 computes the kilohertz range for each IFFT complex element (N). For instance, where N is equal to 256, each IFFT complex element corresponds to 4.688 kHz. Hence, in order to avoid frequencies below 20 kHz, adapter tone mapping module 550 would need to set filter coefficient values for the frequencies associated with the first four (4) IFFT complex elements to zero, and thus, notch the frequency region between DC and 20 kHz.

However, in the event that the notch is to occur within the frequency spectrum, there may be overlapping between tones and thus it may require the number of IFFT complex elements to be expanded for this calculation. This would cause the "N" value, constituting the number of IFFT complex elements, to be multiplied by a selected multiplier M in order to increase resolution. As an example, where M is equal to four (M=4), this expands IFFT in order to notch frequency 50 kHz.

By implementing adaptive notching module 565, ODFM PLC PHY circuit 310 of FIG. 3 is provisioned to have programmable notches at certain frequencies in order to:

a) avoid certain frequencies that are reserved by powerline regulatory bodies for other applications;

b) allow cohabitation with S-FSK systems in compliance with the current IEC 61334-5-1 standard; and c) allow inter-operability with other potential systems operating on powerline.

As shown in FIG. 7A, transmitter 400 of FIG. 4 uses an appropriate scheme to insert notches in spectrum 700. For instance, according to one embodiment of the invention, two frequencies, referred as mark and space frequencies $f_M$ 710 and $f_S$ 720, could be notched in spectrum 700 in order to cohabitate with S-FSK systems. The transmitted power spectral density of notched frequency may be at least 25 dB below the limits specified for rest of the sub-carriers.

Figure 7B:
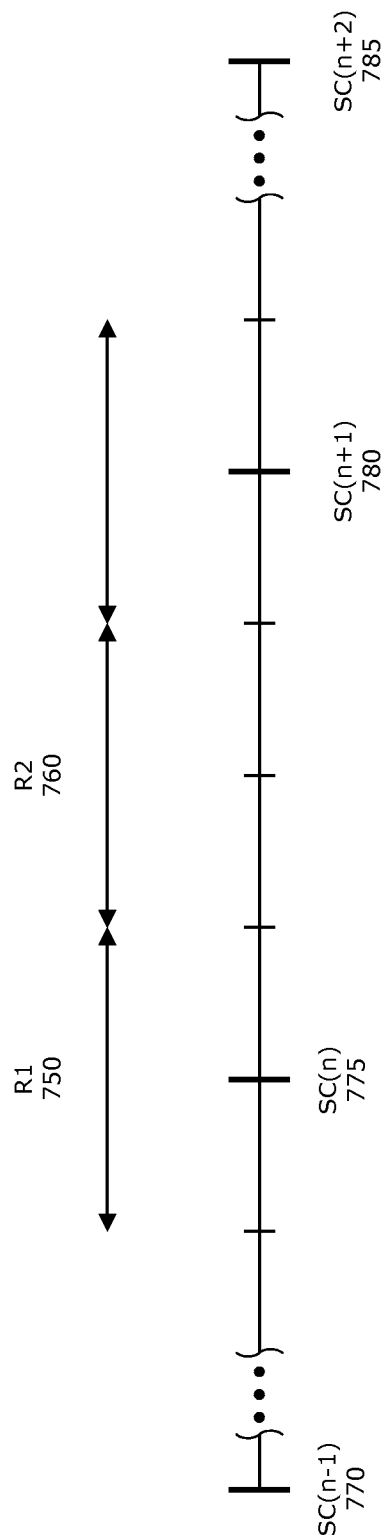
FIG. 7B illustrates an exemplary embodiment of sub-carrier masking performed by the transmitter of FIG. 4.

Depending on the relative position of required notch frequency with respect to sub-carriers, a few sub-carriers are masked. No data is sent over the masked sub-carriers. According to one embodiment of the invention, as shown in FIG. 7B, if the notch frequency is in R1 region 750, sub-carriers SC(n−1) 770, SC(n) 775 and SC(n+1) 780 are masked (total three sub-carriers). If the notch frequency is in R2 region 760, the two nearest sub-carriers in either side (e.g., SC(n−1) 770, SC(n) 775, SC(n+1) 780 and SC(n+2) 785) are masked (total of four sub-carriers).

After frequency-domain pre-emphasis filter module 560 has performed the necessary attenuation offsets and adaptive notching module 565 has performed any desired frequency notching operations, IFFT module 570 using a N-bit IFFT input vector to formulate time domain OFDM words that will precede the cyclic prefix. In other words, IFFT module 570 converts information in the frequency domain into information in the time domain because subsequent operations on the channels are performed in the time domain.

Thereafter, cyclic prefix module 575 is responsible for mitigating ISI by creating a gap between the transmitted symbols. In other words, the programmable cyclic prefix length can be modified according to the delay spread of the channel. The reason is that the channel creates an anomaly by spreading the tones and the tone of one symbol too closely boarders a tone of another symbol. By adding the gap, this could prevent ISI interference.

Referring again to FIGS. 4 and 5A, spectral shaping module 430 comprises an RC shaping module 580 and a time-domain pre-emphasis filter 585. RC shaping module 580 smoothes the OFDM signal by removing high frequency components. Time-domain pre-emphasis filter 585 provides a linear equalization method where the transmit signal spectrum is shaped to compensate for amplitude distortion and to further compensate the transmit signal for attenuation introduced to the signal as it propagates through the power line in the event that frequency domain pre-emphasis filter 560 is not able to accomplish the appropriate attenuation. As a result, time-domain pre-emphasis filter 585 operates as a shelving filter that performs both low pass and high pass filtering, where the gain may be adjusted during the low pass filtering in order to adjust the attenuation of the signal at the higher frequencies.

Shown in FIG. 4, exemplary embodiment of an OFDM receiver 450 supporting multi-tone OFDM based communications within a prescribed low frequency region is shown. Receiver 450 comprises a plurality of logic modules including a data recovery module 460, demodulation module 470, a decoding module 480 and a channel reconfiguration module 490. Blind channel quality measurement scheme may be used to adaptively change the coding and modulation used in a link in order to achieve reliable communications.

Figure 8:
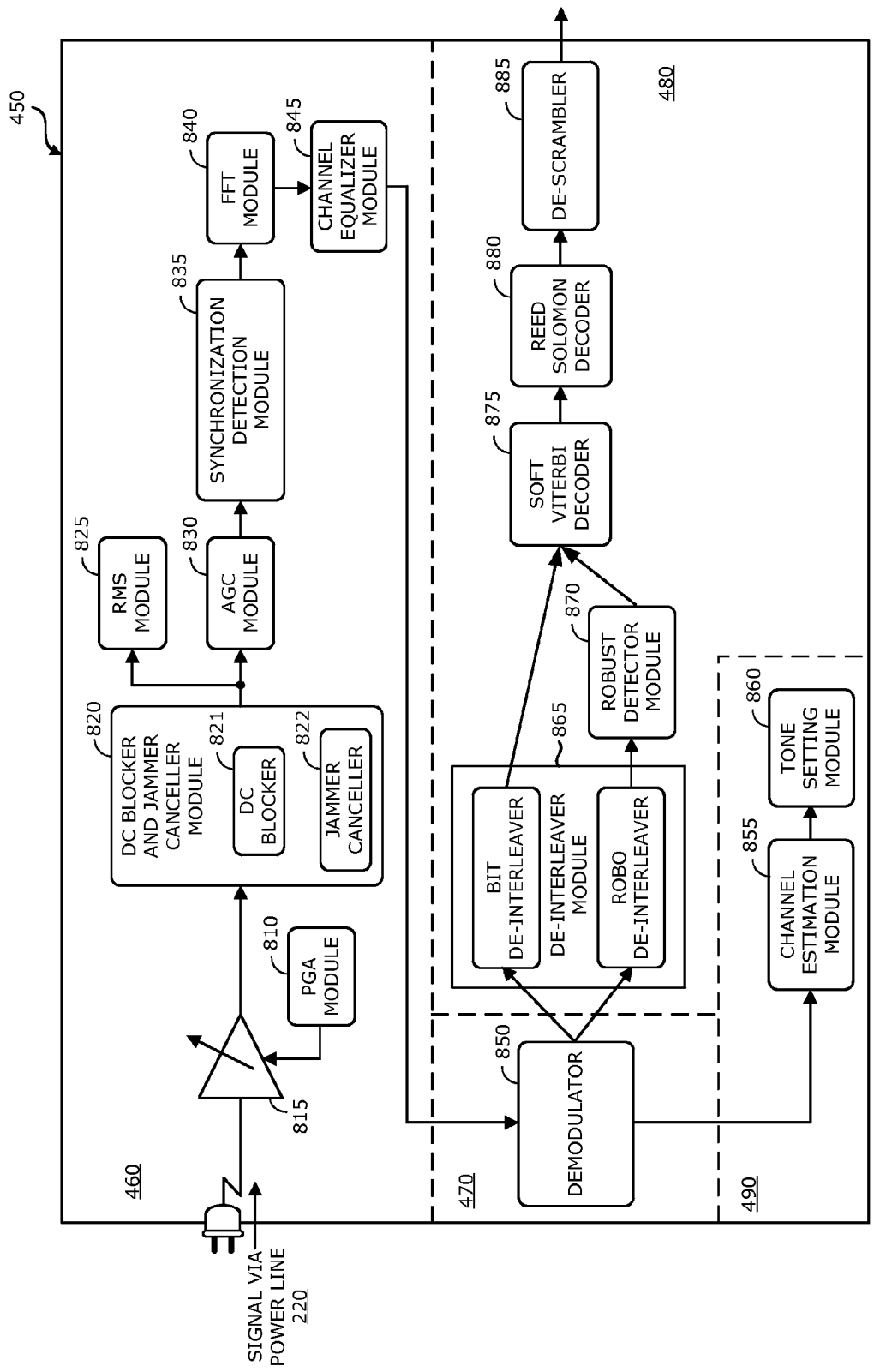
FIG. 8 illustrates a more detailed embodiment of a receiver of the networked device.

Referring now to FIG. 8, data recovery module 460 of OFDM receiver 450 comprises a programmable gain amplifier (PGA) module 810, a channel equalizer module 815, DC blocker and jammer cancellation modules 820, a root-mean-squared (RMS) module 825, an automatic gain control (AGC) module 830, a synchronization detection module 835 and a fast fourier transform (FFT) module 840.

First, PGA module 810 is adapted to manage the amplification of an incoming signal arriving at receiver 450 via power line 220. PGA module 810 measures the incoming signal and determines whether the signal is weak (gain below a predetermined threshold). If so, PGA module 810 adjusts the gain of amplifier 815 in order to amplify the incoming signal in order to achieve a sufficient amplification level for demodulation.

The adjusted signal is routed to DC blocker and jammer cancellation modules 820. DC blocker module 821 is adapted to remove the DC offset from the incoming signal since analog-to-digital converters and analog front-end circuitry are expected to apply at least some DC residual. Jammer cancellation module 822 is configured to detect the presence of a jammer signal and to remove it from the incoming signal. The removal of the DC offset and jamming signals is designed to avoid an incorrect reading by AGC module 830, which is designed to normalize the input signal to a predetermined power level. The presence of interference on the signal may affect gain adjustment of the incoming signal.

RMS module 825 is designed to measure the power of the signal and/or the signal-to-noise ratio (SNR) for use by channel estimation module 855 as described below.

After being adjusted by AGC module 830, which may be adapted to track signal variations and normalizes the received signal to be the proper bit size in order to ensure that soft Viterbi decoder 875 (below) operates optimally, the incoming signal is provided to synchronization detection module 835, which analyzes the contents of the incoming signal to detect the beginning of the preamble symbols and the data symbols. Moreover, synchronization detection module 835 determines the mode of operation of the current PHY frame (Normal or Robust).

As soon as the start of the data symbol is determined and the channel, such data is routed to FFT module 840 to convert the time domain information into the frequency domain. Thereafter, a channel equalizer module 845 performs an adaptive frequency-domain channel equalization (FEQ) technique that compensates for severe attenuation in the channel at high frequencies by equalizing the received signal based on the received signal level of each tone.

As an example, channel equalizer module 845 may feature a table including a set of complex coefficients that are used to correct the amplitude and phase of each sub-carrier where OFDM is used for modulation. The FEQ technique performed by module 845 corrects for the phase and the amplitude distortion introduced into each sub-carrier by multiplying the received constellation point of a sub-carrier (in the frequency domain) with a complex value that is adaptive (e.g., compute using a least mean squares update algorithm). By being made adaptive, channel equalizer module 845 will be able to adjust for variations between various channels, and also, will be able to track variations in the same channel that may occur due to temperature variations and other parameters. In other words, channel equalizer module 845 is adapted to address frequency selective, fading channels. Of course, channel equalizer module 845 could be static in an alternative embodiment.

The output data from channel equalizer module 845 is provided to demodulator module 470. As shown in FIGS. 4 and 8, demodulator module 470 comprises a demodulator 850 that demodulates the incoming signal in order to recover data contained therein. As an illustrative embodiment, the incoming signal is demodulated in accordance with a selected demodulation scheme such as differential binary phase shift keen (DBPSK). The output from demodulator 850 is provided to channel reconfiguration module 490.

Channel reconfiguration module 490 comprises channel estimation module 855 that utilizes the SNR measurements as measured by RMS module 825 to determine whether the signal quality is acceptable to operate a Normal mode or whether receiver 450 needs to operate in a ROBO mode. In general, channel estimation module 855 performs two operations.

First, channel estimation module 855 determines whether the incoming signal exceeds a predetermined SNR value. If the incoming signal features signal-to-noise (SNR) ratio that exceeds the predetermined SNR value, receiver 450 will enter into Normal mode and will signal its transmitter via the MAC layer to transmit a message for receipt by the device featuring transmitter 400 to enter into ROBO mode as well. However, if the SNR levels are satisfactory but the channel is adversely affecting the characteristics of a signal, such as not sufficiently detecting the tones or grossly attenuating the tones, receiver 450 will enter into ROBO mode and signal the corresponding transmitter to enter into ROBO mode.

Besides channel estimation, receiver 450 may signal the corresponding transmitter 400 to adjust the number of tones in the event that the channel attenuation eliminates certain tones and the elimination of such tones does not adversely affect the operations of the system. The tone numbering is set by a tone setting module 860 implemented within channel reconfiguration module 490.

Based on whether receiver 450 is operating in a Normal mode or in a ROBO mode, de-interleaver module 865 of decoding module 480 recovers the data distributed by an interleaver at the transmitting side and provides such data to a soft robust decoder module 870 or directly to convolutional decoder module 875, a Reed-Solomon decoder module 880 and a descrambler module 885 in order to recover the data.

It is noted that AGC module 830 improves the performance of the soft robust decoder module because by normalizing the input data ensure that soft robust decoder module 870 receives enough bits to predict the right information. Herein, soft robust decoder module 870 is in communication with de-interleaver module 865 that makes a determination as to the bit value based on repetitive bits that it analyzes. In other words, soft robust decoder module 870 is an intelligent component that makes a decision as to what is the right value associated with the repetitive data bits in order to fully utilize the coding gained from Robust mode. This is accomplished by giving more weight to sub-carriers of better quality and less noise (e.g. based on SNR measurements) because, more likely than not, the data of these sub-carriers is accurate.

Figure 9:
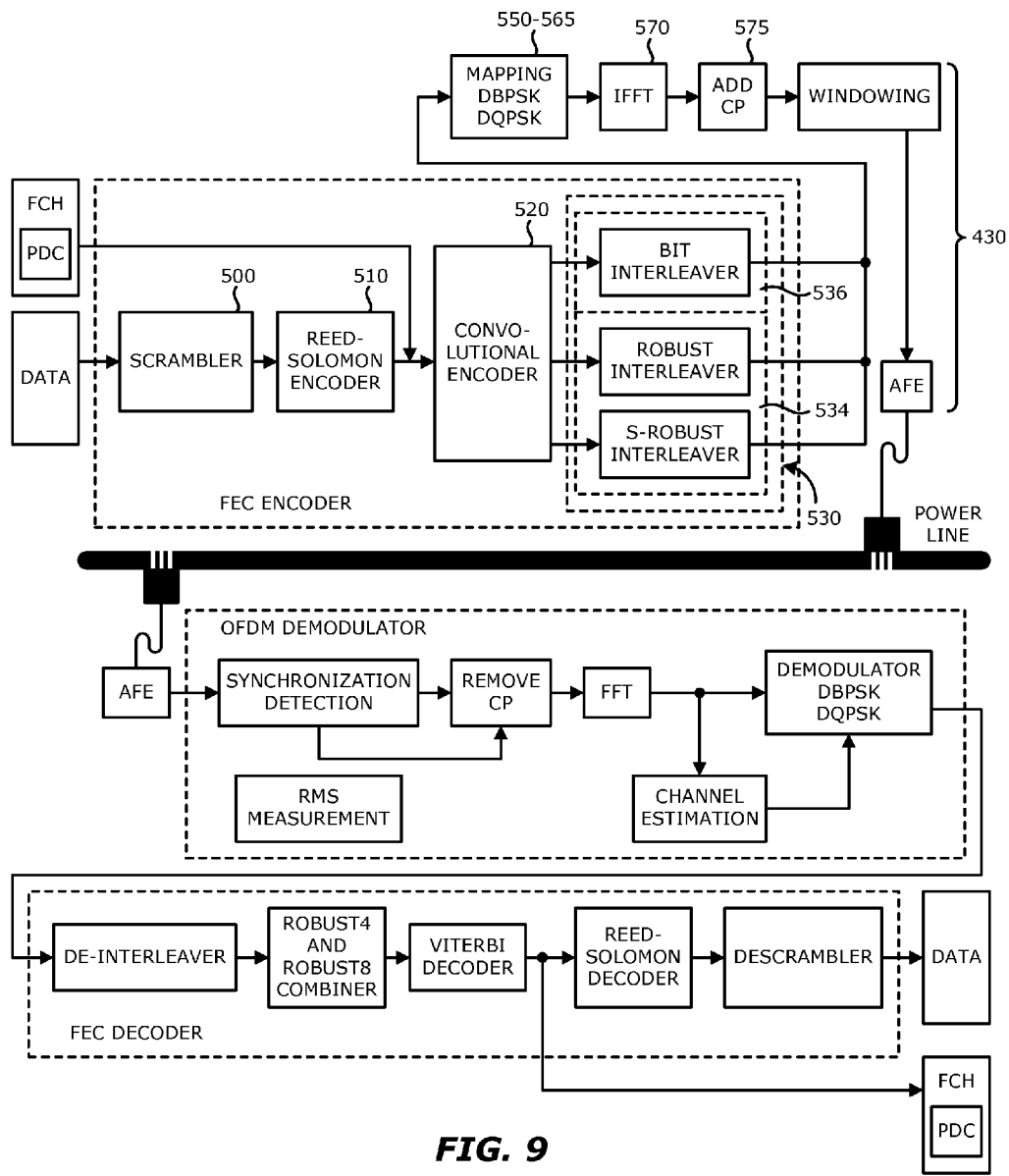
FIG. 9 illustrates a detailed embodiment of a second embodiment of an OFDM system that comprises a transmitter of a network device that includes a G3 interleaver.

Referring now to FIG. 9, a more detailed embodiment of an OFDM system including transmitter 400 and receiver 450 of a network system 900 is shown, with transmitter 400 including a G3-based interleaver 530. The CENELEC bandwidth is divided into a number of sub-channels, which can be viewed as many independent PSK modulated carriers with different non-interfering (orthogonal) carrier frequencies. Convolutional and Reed-Solomon coding provide redundancy bits allowing the receiver to recover lost bits caused by background and impulsive noise. A time-frequency interleaving scheme is used to decrease the correlation of received noise at the input of the decoder, providing diversity.

The OFDM signal is generated by performing IFFT module 570 on the complex-valued signal points produced by differentially encoded phase modulation that are allocated to individual sub-carriers. An OFDM symbol is built by appending a cyclic prefix to the beginning of each block generated by IFFT module 570. The length of cyclic prefix is chosen by cyclic prefix module 575 so that a channel group delay will not cause successive OFDM Symbols or adjacent sub-carriers to interfere.

According to one embodiment of the invention, an OFDM Power Line Communication G3 Physical Layer component (e.g., circuitry 310) supports signaling between 35.9 kHz to 90.6 kHz of the CELENEC-A band. An OFDM with DBPSK, DQPSK and D8PSK modulation schemes per carrier is selected to support up to 33.4 kbps data rate in Normal mode of operation. The DBPSK, DQPSK and D8PSK modulation for each carrier makes the receiver design significantly simpler since no tracking circuitry is required at the receiver for detecting the phase of each carrier. Instead, the phases of carriers in the adjacent symbol are taken as reference for detecting the phases of the carriers in the current symbol.

There is potential to use this standard to support communication in frequencies up to 180 kHz. As a result, the sampling frequency at the transmitter and receiver is selected to be 0.4 MHz in order to provide some margin above the Nyquist frequency for signal filtering in the transmitter (for PSD shaping to remove the signal images) and at the receiver (for band selection and signal enhancement).

The maximum number of carriers that can be used is selected to be 128, resulting in an IFFT size of 256. This results in a frequency spacing between the OFDM carriers equal to 1.5625 kHz*(Fs/N), where Fs is the sampling frequency and N is the IFFT size. Note that imperfection such as sampling clock frequency variation can cause Inter Carrier Interference (ICI). In practice, the ICI caused by a typical sampling frequency variation of about 2% of the frequency spacing, is negligible. In other word, considering ±20 ppm sampling frequency in transmitter and receiver clocks, the drift of the carriers is approximately equal to 8 Hz that is approximately 0.5% of the selected frequency spacing. Considering these selections, the number of usable carriers is obtained as given in Table 8.

TABLE 8

Number of carriers for various bands.

| | Number of Carriers | First Carrier (kHz) | Last Carrier (kHz) |
|---|---|---|---|
| CELENEC A | 36 | 35.938 | 90.625 |

The system works in two different modes namely Normal and Robust modes. In Normal mode, the FEC is composed of a Reed Solomon encoder and a convolutional encoder. The system also supports Reed Solomon code with parity of 8 and 16 Bytes.

In Robust mode the FEC is composed of Reed Solomon and convolutional encoders followed by a Repetition Code (RC) logic 533. RC code logic 533 may be implemented as part of the interleaver and repeats each bit four times making system more robust to channel impairments. This of course will reduce the throughput by about factor of 4. Similarly, in S-Robust mode, RC code logic 533 repeats each bit six times making the system even more robust. The number of symbols in each PHY (Physical Layer) frame is selected based on two parameters, the required data rate and the acceptable robustness. The number of symbols, Reed Solomon block sizes, and data rate associated with 36 tones is tabulated in Tables 9 and 10.

TABLE 9

RS block size for various Modulations

| CENELEC A Number of Symbols | Reed Solomon Blocks DQPSK (Out/In) Bytes P16* | Reed Solomon Blocks DBPSK (Out/In) Bytes P16* | Reed Solomon Blocks Robust (Out/In) Bytes P8* |
|---|---|---|---|
| 12 | (53/37) | (26/10) | N/A |
| 20 | (89/73) | (44/28) | N/A |
| 32 | (143/127) | (71/55) | N/A |
| 40 | (179/163) | (89/73) | (21/13) |
| 52 | (233/217) | (116/100) | (28/20) |
| 56 | (251/235) | (125/109) | (30/22) |
| 112 | N/A | (251/235) | (62/54) |
| 252 | N/A | N/A | (141/133) |

TABLE 10

Data rate for various Modulations (excluding FCH)

| CENELEC A Number of Symbols | Data Rate (DQPSK) bps P16* | Data Rate (DBPSK) bps P16* | Data Rate (Robust) bps P8** |
|---|---|---|---|
| 12 | 12103 | 3271 | N/A |
| 20 | 19456 | 7462 | N/A |
| 32 | 26489 | 11471 | N/A |
| 40 | 29693 | 13298 | 2423 |
| 52 | 33221 | 15309 | 3121 |
| 56 | 34160 | 15844 | 3257 |
| 112 | N/A | 20009 | 4647 |
| 252 | N/A | N/A | 5592 |

Table 11 shows the rate including the data transmitted in FCH. To calculate the data rate, it is assumed that the packets are continuously transmitted with no inter frame time gap

TABLE 11

Data rate for various Modulations (including FCH)

| CENELEC A Number of Symbols | Data Rate (DQPSK) bps P16* | Data Rate (DBPSK) bps P16* | DataRate (Robust) bps P8** |
|---|---|---|---|
| 12 | 13453 | 4620 | N/A |
| 20 | 20556 | 8562 | N/A |
| 32 | 27349 | 12332 | N/A |
| 40 | 30445 | 14049 | 3192 |
| 52 | 33853 | 15941 | 3765 |
| 56 | 34759 | 16444 | 3867 |
| 112 | N/A | 20360 | 5002 |
| 252 | N/A | N/A | 5765 |

The data rate is calculated based on the number of symbols per PHY frame ($N_S$), number of carrier per symbol ($N_{carr}$) and number of parity bits added by FEC blocks. As an example, consider the system in the CENELEC A band working in Robust mode. Total number of bits carried by the whole PHY frame is equal to:

$$\text{Total\_No\_Bits} = N_S \times N_{carr} = 40 \times 36 = 1440 \text{ bits}$$

The number of bits required at the input of Robust encoder is given by:

$$\text{No\_Bits\_Robust} = 1440 \times \text{Robust}_{Rate} = 1440 \times 1/4 = 360 \text{ bits}$$

Considering the fact that convolutional encoder has a rate equal to ½ ($CC_{Rate} = 1/2$) and also consider adding CCZerotail=6 bits of zeros to terminate the states of the encoder to all zero states then the maximum number of symbols at the output of Reed Solomon encoder ($MAXRS_{bytes}$) must be equal to:

$$MAXRS_{bytes} = \text{floor}((\text{No\_Bits\_Robust} \times CC_{Rate} - CCZeroTail)/8) = \text{floor}((360 \times 1/2 - 6)/8) = 21$$

Symbols Removing 8 symbols associated with the parity bits (in Robust mode) we obtain:

$$\text{DataLength} = (21 - \text{ParityLength}) \times 8 = 104 \text{ bits}$$

These 280 bits are carried within the duration of a PHY frame. The duration of a PHY frame is calculated by the following formula:

$$T\text{Frame} = (((NS + NFCH) \times (NCP + N - N_O) + (N_{pre} \times N)))/F_s$$

Where $N_{pre}$, N, $N_O$ and $N_{CP}$ are the number of symbols in the preamble, FFT length, the number of samples overlapped at each side of one symbol and the number of samples in the cyclic prefix, respectively. $N_{FCH}$ is the number of symbols in the FCH. The $F_s$ is the sampling frequency. Typical values for all these parameters for various frequency bands are given in 10.

TABLE 12

System Specifications

| | |
|---|---|
| Number of FFT points | N = 256 |
| Number of overlapped samples | $N_O$ = 8 |
| Number of cyclic Prefix samples | $N_{CP}$ = 30 |
| Number of FCH symbols | $N_{FCH}$ = 13 |
| Sampling frequency | $F_s$ = 0.4 MHz |
| Number of symbols in Preamble | $N_{pre}$ = 9.5 |

Substituting the above numbers in the equation, $T_{Frame}$ (PHY frame duration) for a 40-symbol frame is obtained as follows:

$$T_{Frame} = ((40+13) \times (256+22) + (9.5 \times 256))/400000 = 0.0429 \text{ sec}.$$

Therefore the data rate is calculated by:

$$\text{Data rate} = 104/0.0429 \sim 2.5 \text{ kbps}$$

Figure 10:
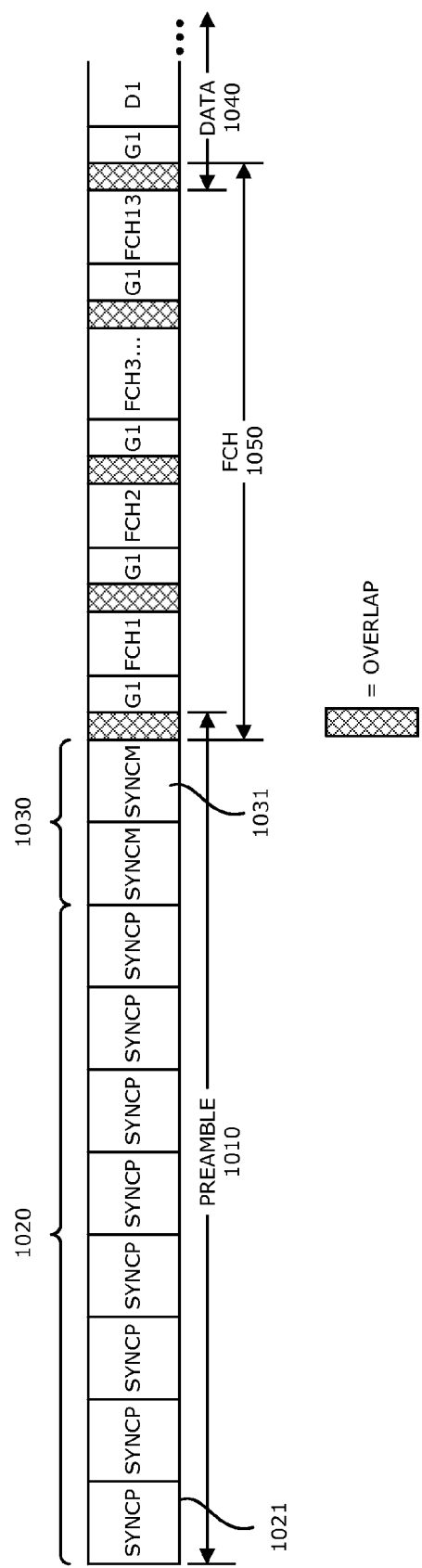
FIG. 10 illustrates an embodiment of a data frame for the OFDM PHY.

The PHY supports two types of frames. One embodiment of a data frame for the OFDM PHY is shown in FIG. 10. Each frame 1000 starts with a preamble 1010, which is used for synchronization and detection in addition to AGC adaptation. "SYNCP" simply refers to symbols that are multiplied by +1 in the sign function above, and "SYNCM" refers to symbols multiplied by −1. Preamble 1010 comprises eight SYNCP symbols 1020 (e.g., 8 'P' symbols) followed by one and a half SYNCM symbols 1030 with no cyclic prefix between adjacent symbols. The first symbol (first SYNCP 1021) includes raised cosine shaping on the leading points. The last half symbol 1031 also includes raised cosine shaping on the trailing points. Preamble 1010 is followed by 13 data symbols 1040 allocated to Frame Control Header (FCH) 1050. FCH 1050 has the important control information required to demodulate the data frame. Data symbols 1060 are transmitted next. In FIG. 10, "GI" stands for guard interval, which is the interval containing the cyclic prefix.

Figure 11:
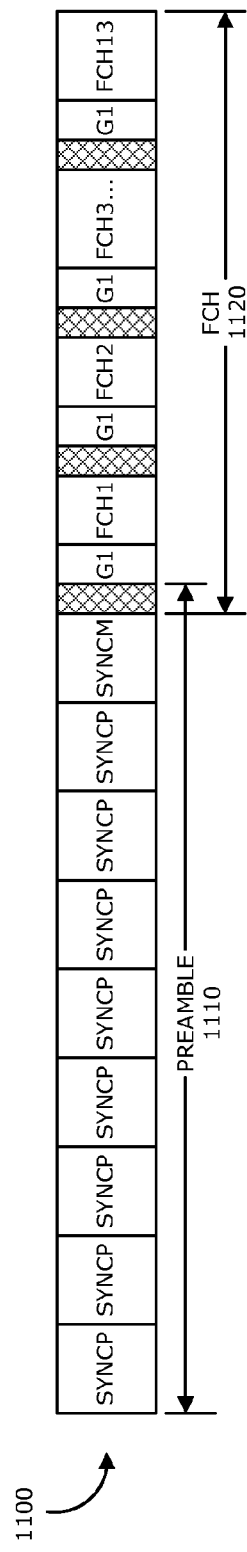
FIG. 11 illustrates an exemplary embodiment of a frame structure of the ACK frame.

The PHY also supports an ACK/NACK frame 1100, which only consists of a preamble 1110 and FCH 1120. An exemplary embodiment of a frame structure of an ACK frame 1100 is shown in FIG. 11. The bit fields in FCH 1120, explained below will perform the ACK/NACK signaling.

Figure 12:
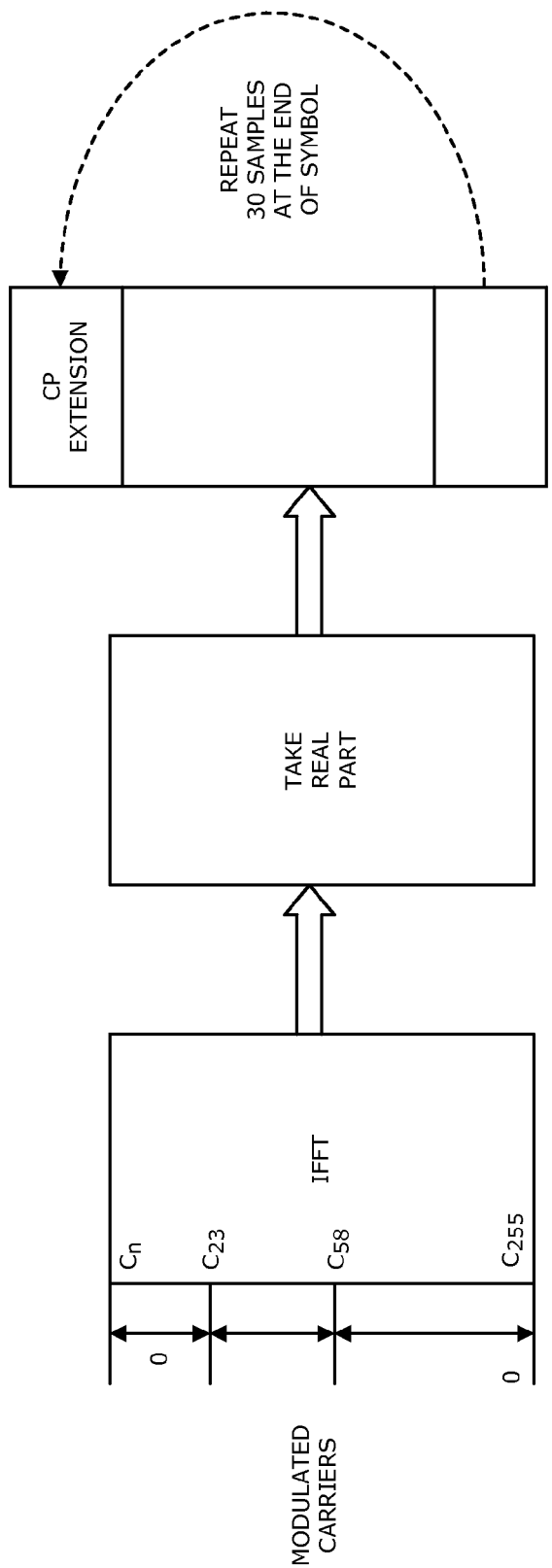
FIG. 12 illustrates one embodiment how the plurality of sub-carriers are mapped to the IFFT input.

The preamble is composed of 8 identical P symbols (SYNCP) and 1½ identical M symbols (SYNCM). Each of the P and M symbols is 256 samples and is pre-stored in the transmitter and transmitted right before the data symbols. The P symbols are used for AGC adaptation, symbol synchronization, channel estimation and initial phase reference estimation. The M symbols are identical to P symbols except that all the carriers are π phase shifted. At the receiver, the phase distance between symbol P and symbol M waveforms is used for frame synchronization. A P symbol is generated by creating 36 equally spaced carriers with the phase of each carrier given by $\phi_c$ as shown in Table 13. One way to generate this signal is to start in the frequency domain and create 36 complex carriers with the initial phases $\phi_c$, as shown in Table 13. FIG. 12 shows how the 36 sub-carriers are mapped to the IFFT input where the first modulated sub-carrier is sub-carrier 23 and the last modulated sub-carrier is sub-carrier 58.

TABLE 13

Phase Vector Definition

| c | $\phi c$ |
|---|---|
| 0 | 2 (π/8) |
| 1 | 1 (π/8) |
| 2 | 0 (π/8) |
| 3 | 15 (π/8) |
| 4 | 14 (π/8) |
| 5 | 12 (π/8) |
| 6 | 10 (π/8) |
| 7 | 7 (π/8) |
| 8 | 3 (π/8) |
| 9 | 15 (π/8) |
| 10 | 11 (π/8) |
| 11 | 6 (π/8) |
| 12 | 1 (π/8) |
| 13 | 11 (π/8) |
| 14 | 5 (π/8) |
| 15 | 14 (π/8) |
| 16 | 7 (π/8) |
| 17 | 15 (π/8) |
| 18 | 7 ((π/8) |
| 19 | 15 (π/8) |
| 20 | 6 (π/8) |

TABLE 13-continued

Phase Vector Definition

| c | φc |
|---|---|
| 21 | 13 (π/8) |
| 22 | 2 (π/8) |
| 23 | 8 (π/8) |
| 24 | 13 (π/8) |
| 25 | 2 (π/8) |
| 26 | 6 (π/8) |
| 27 | 10 (π/8) |
| 28 | 13 (π/8) |
| 29 | 0 |
| 30 | 2 (π/8) |
| 31 | 3 (π/8) |
| 32 | 5 (π/8) |
| 33 | 6 (π/8) |
| 34 | 7 (π/8) |
| 35 | 7 (π/8) |

With respect to one embodiment of frame control header (FCH) 1050, the four data symbols immediately after preamble are reserved for frame control header. The FCH is a data structure transmitted at the beginning of each data frame and contains information regarding the current frame. It has information about type of the frame, tone map index of the frame, length of the frame, etc. The FCH data is protected with CRC5. Table 14 defines the structure of FCH. In one embodiment, the FCH can use the default tone MAP (all allowed sub-carriers).

TABLE 14

FCH bit fields

| Field | Byte | Bit number | Bits | Definition |
|---|---|---|---|---|
| PDC | 0 | 7-0 | 8 | Phase detection counter |
| MOD | 1 | 7-6 | 2 | Modulation type:<br>0 - ROBO;<br>1 - DBPSK<br>2 - DQPSK |
| FL | 1 | 5-0 | 6 | PHY frame length in PHY symbols |
| TM[0:23] | 2, 3, 4 | 7-0 | 8 | TM[0:23]-Tone map |
| RESERVED | 5 | 0-4 | 5 | reserved |
| DT | 5 | 7-5 | 3 | Delimiter type:<br>000: Start of frame with no response expected;<br>001: Start of frame with response expected;<br>010: Positive acknowledgement (ACK)<br>011: Negative acknowledgement (NACK)<br>100-111: Reserved |
| FCCS | 6 | 7-0 | 8 | Frame Control Check Sequence (CRC8) |
| ConvZeros | 7 | 5-0 | 6 | 6 zeros for convolutional encoder |
| Field | Byte | Bit number | Bits | Definition |

The frame length bit field gives the number of symbols in the frame based on the formula Number of Symbols=*FL*\*4

Although not shown, a 5-bit cyclic redundancy check (CRC) is used to for error detection in FCH. The CRC5 is computed as a function of the 34-bit sequence. The CRC5 is calculated using the following standard generator polynomial of degree 5:

$G(x)=x^5+x^2+1$, where CRC5 is the reminder of the division of the FCH polynomial by the generator polynomial.

Referring back to FIG. 9, according to one embodiment of the invention, scrambler 500 helps give the data a random distribution. The data stream is 'XOR-ed' with a repeating PN sequence using the following generator polynomial:

$$S(x) = x^7 \oplus x^4 \oplus 1$$

This is illustrated in FIG. 5C. The bits in the scrambler are initialized to all ones at the start of processing each PHY frame.

With respect to FEC coding, the FEC encoder is composed of Reed-Solomon (RS) encoder 510 followed by convolutional encoder 520. In Robust mode, an extra encoder, namely, Repetition Code (RC) logic (not shown), is used after convolutional encoder 520 in order to repeat the bits at the output of convolutional encoder four times.

Reed Solomon Encoder

Data from the scrambler is encoded by shortened systematic RS (N=255, K=239, T=8) and RS (N=255, K=247, T=4) codes using Galois Field GF($2^8$). The RS symbol word length (i.e., the size of the data words used in the Reed-Solomon block) is fixed at 8 bits. The value of T (number of correctable symbol errors) can be either 4 or 8 for different configurations. For Robust mode, the code with T=4 is used. The number of parity words in a RS-block is 2 T bytes.

$$\text{Code Generator Polynomial } g(x) = \prod_{i=1}^{2T} (x - \alpha^i)$$

Field Generator Polynomial: p (x)=$x^8+x^4+x^3+x^2+1$ (435 octal)

The representation of α0 is "00000001", where the left most bit of this RS symbol is the MSB and is first in time from the scrambler and is the first in time out of the RS encoder.

The arithmetic is performed in the Galois Field GF($2^8$), where α1 is a primitive element that satisfies the primitive binary polynomial $x^8+x^4+x^3+x^2+1$. A data byte ($d^7, d^6, \ldots, d^1, d^0$) is identified with the Galois Field element $d^7\alpha^7 + d^6\alpha^6 \ldots + d^1\alpha + d^0$.

The first bit in time from scrambler 500 becomes the most significant bit of the symbol at the input of RS encoder 510. Each RS encoder input block is formed by one or more fill symbols ("00000000") followed by the message symbols. Output of the RS encoder (with fill symbols discarded) proceeds in time from first message symbol to last message symbol followed by parity symbols, with each symbol shifted out most significant bit first.

Convolutional Encoder

The bit stream at the output of RS encoder 510 is encoded with a standard rate=½, K=7 Convolutional encoder 520. The tap connections are defined as x=0b1111001 and y=0b1011011, as shown in 5D.

When the last bit of data to convolutional encoder 520 has been received, convolutional encoder 520 inserts six tail bits, which are required to return the convolutional encoder to the "zero state". This improves the error probability of the convolutional decoder, which relies on future bits when decoding. The tail bits are defined as six zeros.

Repetition Coding by 4

In Robust mode, the resulting packet is repeated four times by the RC code logic within interleaver 530 as represented by "Robust interleaver" 910 in FIG. 9. This encoder is only activated in Robust mode. The repetition is done by repeating the frame four times. For the FCH, the Super Robust (S-Robust) mode is used as represented by S-Robust interleaver 920 in FIG. 9. This mode uses repetition of 6 for increased robustness.

Repetition Coding by 6

In Super Robust (S-Robust) mode, the resulting packet is repeated six times by RC code logic within interleaver 530. The repetition is done by repeating the frame six times. The S-Robust mode is used only for frame control portion (FCH) of a data frame.

With respect to the interleaver as illustrated in FIG. 8, this interleaver is designed such that it can provide protection against two different sources of errors as describe above; namely (1) a burst error and (2) a frequency deep fade. The functionality of interleaver is illustrated in FIGS. 5E-5F and described above.

Each carrier is modulated with Differential Binary or Differential Quadrature Phase Shift Keying (BPSK, DBPSK, DQPSK or DBPSK) or Robust. Robust modulation is a robust form of DBPSK that provides extensive time and frequency diversity to improve the ability of the system to operate under adverse conditions. Forward error correction coding (FEC) is applied to both the frame control information (Super Robust encoding) and the data (concatenated Reed-Solomon and Convolutional Encoding) in the communication packet.

The mapping block is also responsible for assuring that the transmitted signal conforms to the given Tone Map and Tone Mask. The Tone Map and Mask are concepts of the MAC layer. The Tone Mask is a predefined (static) system-wide parameter defining the start, stop and notch frequencies. The Tone Map is an adaptive parameter that, based on channel estimation, contains a list of carriers that are to be used for a particular communication between two modems. For example, carriers that suffer deep fades can be avoided, and no information is transmitted on those carriers.

Mapping for DBPSK, DQPSK, D8PSK, Robust

Data bits are mapped for differential modulation (DBPSK, DQPSK, D8PSK or Robust). Instead of using the phase reference vector $\phi$, each phase vector uses the same carrier, previous symbol, as its phase reference. The first data symbol uses the pre-defined phase reference vector. The data encoding for Robust, DBPSK, DQPSK and D8PSK is defined in Table 15 and Table 16, where $\Psi_k$ is the phase of the k-th carrier from the previous symbol. In DBPSK (and Robust) a phase shift of 0 degrees represents a binary "0" and a phase shift of 180 degrees represent a binary "1". In DQPSK a pair of 2 bits is mapped to 4 different output phases. The phase shifts of 0, 90, 180, and 270 degrees represent binary "00", "01", "11", and "10", respectively.

| Input Bit | Output Phase |
|---|---|
| 0 | $\Psi_k$ |
| 1 | $\Psi_k + \pi$ |

| Input Bit Pattern (X,Y), Y is from first interleaver matrix | Output Phase |
|---|---|
| 00 | $\Psi_k$ |
| 01 | $\Psi_k + \pi/2$ |
| 11 | $\Psi_k + \pi$ |
| 10 | $\Psi_k + 3\pi/2$ |

Figure 13:
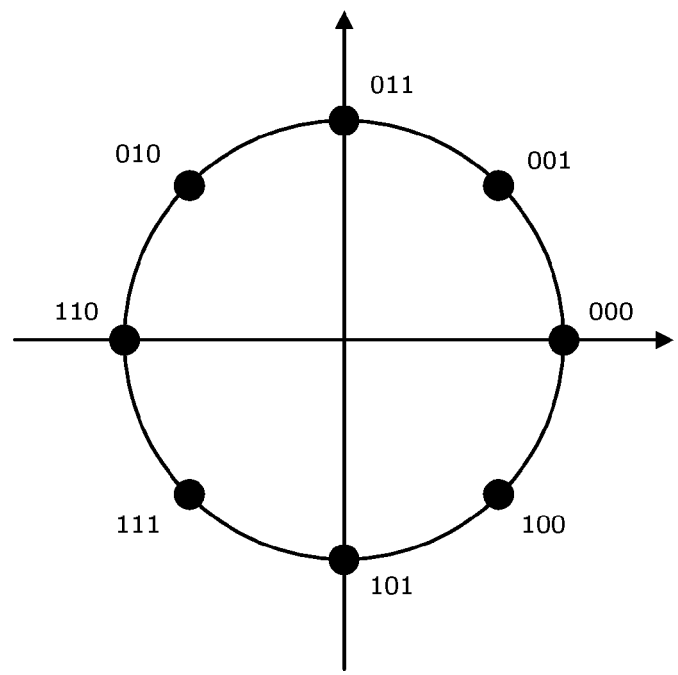
FIG. 13 illustrates an embodiment of the properties of D8PSK modulation.

In D8PSK, three bits are combined to build each complex symbol. There are eight levels of phase shifts 0, 45, 90, 135, 180, 225, 270 and 315 that are selected based on the values of the three bits. The bits are usually grey-encoded so that every two adjacent symbols differ in one bit only, this property is utilized in the soft decoding process. Table 17 and FIG. 13 show properties of D8PSK modulation.

TABLE 17

| D8PSK Encoding Table of k-th Sub-carrier | |
|---|---|
| Input Bit Pattern (X,Y), Y is from first interleaver matrix | Output Phase |
| 000 | $\Psi_k$ |
| 001 | $\Psi_k + \pi/4$ |
| 011 | $\Psi_k + \pi/2$ |
| 010 | $\Psi_k + 3\pi/4$ |
| 110 | $\Psi_k + \pi$ |
| 111 | $\Psi_k + 5\pi/4$ |
| 101 | $\Psi_k + 3\pi/2$ |
| 100 | $\Psi_k + 7\pi/4$ |

Figure 14:
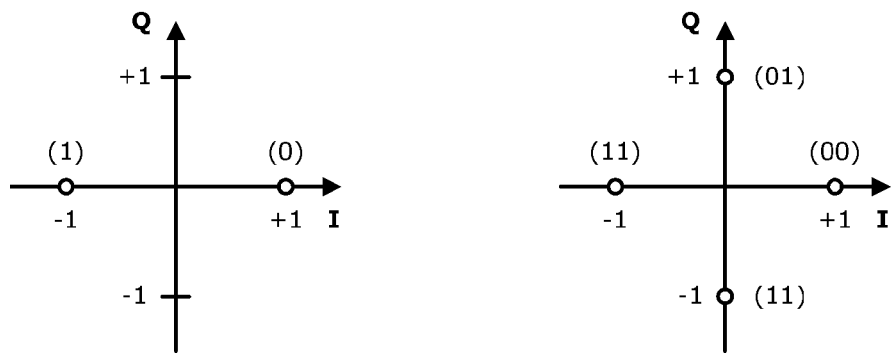
FIG. 14 illustrates an embodiment of BPSK and DPSK constellation diagrams.

Alternatively, the phase differences used to compute "output phases" in Table 15 and Table 16 can be represented in a constellation diagram (with reference phase assumed equal to 0 degrees), as shown in FIG. 14.

With respect to soft decoding, to enhance the performance, it is possible to use soft-decoding for the modulations that were defined previously. By soft-decoding the hard value of the bits is not decided in the output of the demodulator, instead a real (usually fixed width) value is assigned to each bit based on its reliability (the likelihood of that bit being zero or one). This reliability information can then be used in channel decoders to improve the performance significantly.

AC Phase Detection

It is necessary to know which phase each networked device is placed, especially for wireless meters, for synchronization purposes. Phase detection is performed by transmitter networked device (e.g. Tx-meter) 400 generating a time stamp based on a internal, phase detection counter at the instant a packet shall be transmitted. The internal counter, referred to as "PDC" 930 in FIG. 9, uses the zero-crossing as a reference (i.e. the internal counter is synchronized to a zero-crossing detector). Receiver networked device (e.g., RX-meter) 450 provides its own time stamp and delay between the Tx-meter and the Rx-meter provides the phase difference. The procedure to achieve the phase difference between transmitter and receiver networked devices 400 and 450 is as follows:

(a) The networked devices feature an internal timer, which are synchronized to zero-crossing detector;

(b) The transmitter networked device 400 includes a multi-bit (e.g., 8-bit) counter that provides a time stamp placed on the FCH frame upon transmission of payload; and (c) Upon detection of FCH frame, the receiver networked device 450 computes the delay, which is the deference between transmit counter (Tx_Counter) and receive counter (Rx_Counter). The phase differential shall be computed shown below in equation (6) below.

$$\text{Phase differential} = (Rx\_Counter - Tx\_Counter)/3 \qquad (6)$$

Electromagnetic propagation time and additional delay for packet processing and detection shall be considered measuring delay. Electromagnetic propagation delay is 5.775 us/km, which can be neglected; however, processing delay should be factored into equation (6) above so that:

$$\text{New\_Phase differential} = (Rx\_counter - detection\_delay) - (Tx\_Counter - transmission\_delay)/3 \qquad (7)$$

While the invention has been described in terms of several embodiments, the invention should not be limited to only those embodiments described, but can be practiced with modification and alteration within the spirit and scope of the invention as will be claimed.

What is claimed is:

1. A method to detect a phase connection of a receiver of a power line communication system, comprising:
   providing a first connection between a transmitter and one phase of a multi-phase power line;
   detecting a zero crossing of a first signal provided by the first connection;
   generating a first timestamp before a packet is transmitted by the transmitter, wherein a value of the first timestamp is based on the zero crossing of the first signal provided by the first connection;
   adding the first timestamp to a header of the packet;
   sending the packet over the power line communication system to the receiver;
   providing a second connection between the receiver and one phase of the multi-phase power line;
   detecting a zero crossing of a second signal provided by the second connection;
   generating a second timestamp when the packet is received by the receiver, wherein a value of the second timestamp is based on the zero crossing of the second signal;
   comparing the value of the first timestamp to the value of the second timestamp to determine whether the one phase of the first connection is the same as the one phase of the second connection;
   wherein the zero crossing of the first signal resets a first count and wherein the value of the first timestamp is based on the first count;
   wherein the zero crossing of the second signal resets a second count and wherein the value of the second timestamp is based on the second count; and
   generating a phase differential by calculating a difference between the second count and the first count and by dividing the difference by 3.

2. A method to detect a phase connection of a receiver of a power line communication system, comprising:
   providing a first connection between a transmitter and one phase of a multi-phase power line;
   detecting a zero crossing of a first signal provided by the first connection;
   generating a first timestamp before a packet is transmitted by the transmitter, wherein a value of the first timestamp is based on the zero crossing of the first signal provided by the first connection;
   adding the first timestamp to a header of the packet;
   sending the packet over the power line communication system to the receiver providing a second connection between the receiver and one phase of the multi-phase power line;
   detecting a zero crossing of a second signal provided by the second connection;
   generating a second timestamp when the packet is received by the receiver, wherein a value of the second timestamp is based on the zero crossing of the second signal;
   comparing the value of the first timestamp to the value of the second timestamp to determine whether the one phase of the first connection is the same as the one phase of the second connection;
   wherein the zero crossing of the first signal resets a first count and wherein the value of the first timestamp is based on the first count;
   wherein the zero crossing of the second signal resets a second count and wherein the value of the second timestamp is based on the second count; and
   generating a phase differential by calculating a difference between the second count less a detection delay and the first count less a transmission delay and by dividing the difference by 3.

3. A system, comprising:
a transmitter device including a first connection to one phase of a multi-phase power line and including:
   a first zero crossing detector that detects a zero crossing of a first signal provided by the first connection;
   a first timestamp generator that generates a first timestamp before a packet is transmitted by the transmitter, wherein a value of the first timestamp is based on the zero crossing of the first signal provided by the first connection;
   a packet transmitter that adds the first timestamp to a header of the packet and transmits the packet over the power line;
a receiver including a second connection between the receiver and one phase of the multi-phase power line and further including:
   a second zero crossing detector that detects a zero crossing of a second signal provided by the second connection;
   a second timestamp generator that generates a second timestamp when the packet is received by the receiver, wherein a value of the second timestamp is based on the zero crossing of the second signal; and
   a phase detector that compares the value of the first timestamp to the value of the second timestamp to determine whether the one phase of the first connection is the same as the one phase of the second connection,
wherein the first timestamp generator includes a first counter that provides a first count that is reset by the zero crossing of the first signal, wherein the value of the first timestamp is based on the first count,
wherein the second timestamp generator includes a second counter that provides a second count that is reset by the zero crossing of the second signal, wherein the value of the second timestamp is based on the second count, and
wherein the phase detector generates a phase differential by calculating a difference between the second count and the first count and by dividing the difference by 3.

4. A system, comprising:
a transmitter device including a first connection to one phase of a multi-phase power line and including:
   a first zero crossing detector that detects a zero crossing of a first signal provided by the first connection;
   a first timestamp generator that generates a first timestamp before a packet is transmitted by the transmitter, wherein a value of the first timestamp is based on the zero crossing of the first signal provided by the first connection;
   a packet transmitter that adds the first timestamp to a header of the packet and transmits the packet over the power line;
a receiver including a second connection between the receiver and one phase of the multi-phase power line and further including:
   a second zero crossing detector that detects a zero crossing of a second signal provided by the second connection;
   a second timestamp generator that generates a second timestamp when the packet is received by the receiver, wherein a value of the second timestamp is based on the zero crossing of the second signal; and a phase detector that compares the value of the first timestamp to the value of the second timestamp to determine whether the one phase of the first connection is the same as the one phase of the second connection, wherein the first timestamp generator includes a first counter that provides a first count that is reset by the zero crossing of the first signal, wherein the value of the first timestamp is based on the first count, wherein the second timestamp generator includes a second counter that provides a second count that is reset by the zero crossing of the second signal, wherein the value of the second timestamp is based on the second count, and wherein the phase detector generates a phase differential by calculating a difference between the second count less a detection delay and the first count less a transmission delay and by dividing the difference by 3.

* * * * *

UNITED STATES PATENT AND TRADEMARK OFFICE
CERTIFICATE OF CORRECTION

PATENT NO. : 8,879,379 B1  Page 1 of 1
APPLICATION NO. : 13/670838
DATED : November 4, 2014
INVENTOR(S) : Kaveh Razazian It is certified that error appears in the above-identified patent and that said Letters Patent is hereby corrected as shown below:

In the Specification:

| | |
|---|---|
| Column 6, Line 8 | Before "PHY", insert --PLC-- |
| Column 7, Line 9 (approx.) | Delete "$N_c$" and insert --$N_C$-- |
| Column 7, Line 11 (approx.) | Delete "$N_E$" and insert --$N_B$-- |
| Column 7, Line 11 (approx.) | Delete "$N_c$" and insert --$N_C$-- |
| Column 7, Line 28 (approx.) | Delete "$N_E$" and insert --$N_B$-- |
| Column 8, Line 14 (approx.) | Delete "$\alpha_1$" and insert --$\alpha^1$-- |
| Column 8, Line 15 (approx.) | Delete "$\alpha_3$" and insert --$\alpha^3$-- |
| Column 8, Line 62 (approx.) | Delete "NA/NB" and insert --$N_A/N_B$-- |
| Column 8, Line 62 (approx.) | Delete "NA/NB" and insert --$N_A/N_B$-- |
| Column 13, Line 62 | Delete "300" and insert --310-- |

Signed and Sealed this
Twelfth Day of May, 2015

Michelle K. Lee
*Director of the United States Patent and Trademark Office*